(12) United States Patent
Buschmeier et al.

(10) Patent No.: US 6,329,019 B1
(45) Date of Patent: Dec. 11, 2001

(54) PROCESS AND DEVICE FOR COATING GLASS CONTAINERS AND COATED GLASS CONTAINERS

(75) Inventors: Ulrich Buschmeier, Obernkirchen; Jürgen Bülow, Stadthagen; Hermann Bögert, Auetal; Hans-Bernhard Führ, Stadthagen; Henning Meyer, Obernkirchen; Hilmar Schulze-Bergkamen, Minden; Hans-Georg Seidel; Gerhard Weiss, both of Rinteln; Gerhard Geisel; Antonio Leone, both of Bückeburg, all of (DE)

(73) Assignee: The Firm Hermann Heye, Obernkirchen (DE)

( * ) Notice: Subject to any disclaimer, the term of this patent is extended or adjusted under 35 U.S.C. 154(b) by 0 days.

(21) Appl. No.: 09/180,311
(22) PCT Filed: May 1, 1997
(86) PCT No.: PCT/EP97/02233
§ 371 Date: Nov. 6, 1998
§ 102(e) Date: Nov. 6, 1998
(87) PCT Pub. No.: WO97/41966
PCT Pub. Date: Nov. 13, 1997

(30) Foreign Application Priority Data

May 7, 1996 (DE) .............................................. 196 18 206

(51) Int. Cl.$^7$ .............................. B05D 3/02; B05D 1/18; B05C 3/00; B05C 13/00; A47G 19/22
(52) U.S. Cl. .................... 427/314; 427/389.7; 427/430.1; 118/406; 118/503; 118/504; 118/423; 428/34.4; 428/430; 428/435
(58) Field of Search ................................. 428/34.4, 34.5, 428/430, 441, 435; 427/287, 314, 372.2, 430.1, 389.7; 118/423, 426, 406, 503, 504

(56) References Cited

U.S. PATENT DOCUMENTS

| 3,200,002 | * | 8/1965 | Lusher | 117/54 |
| 3,270,710 | * | 9/1966 | Johnson et al. | 118/65 |
| 4,022,155 | * | 5/1977 | Campagna et al. | 118/423 |

FOREIGN PATENT DOCUMENTS

| 2219470 | 11/1972 | (DE) . |
| 2310923 | 3/1973 | (DE) . |
| 2655411 A1 | 6/1977 | (DE) . |

(List continued on next page.)

OTHER PUBLICATIONS

Pp. 473–475 from the German periodical SPRECHSAAL, vol. 122, No. 5, 1989 entitled "Moglichkeiten der Gewichtsreduzierung bei der Herstellung von Mehrwegflashen" by Dr. Eberhard Irmer, Coburg.

*Primary Examiner*—Rena L. Dye
*Assistant Examiner*—Michael C. Miggins
(74) *Attorney, Agent, or Firm*—Synnestvedt & Lechner LLP

(57) ABSTRACT

Glass containers (3) are taken to a high temperature in an annealing furnace (7) and removed from the annealing furnace belt (5) by grips (16) of a gripping device (12). The gripping device (12) is then moved by a handling device (13) first vertically upwards, then horizontally above a fluidized bed (18) and then downwards into the fluidized bed in order to coat the glass containers (3) with a powder; it is then taken upwards out of the fluidized bed (18) and finally moved horizontally over a conveyor belt (22). There, the glass containers (3) are released from the gripping device (12) and set down on the conveyor belt (22) which takes the powder-coated glass containers (3) through a second curing region (27) in which the powder is cured to form a substantially duroplastic layer.

10 Claims, 13 Drawing Sheets

FOREIGN PATENT DOCUMENTS

| | | |
|---|---|---|
| 2748969 A1 | 5/1979 | (DE) . |
| 2510734 B2 | 6/1979 | (DE) . |
| 2617976 B2 | 8/1979 | (DE) . |
| 2431952 | 8/1982 | (DE) . |
| 46 06 964.5 | 5/1992 | (DE) . |
| 0422735 A2 | 8/1991 | (EP) . |
| 0 442 735 A2 * | 8/1991 | (EP) . |
| WO 90/05031 | 5/1990 | (WO) . |
| WO94/17002 A1 | 8/1994 | (WO) . |

* cited by examiner

Fig. 4
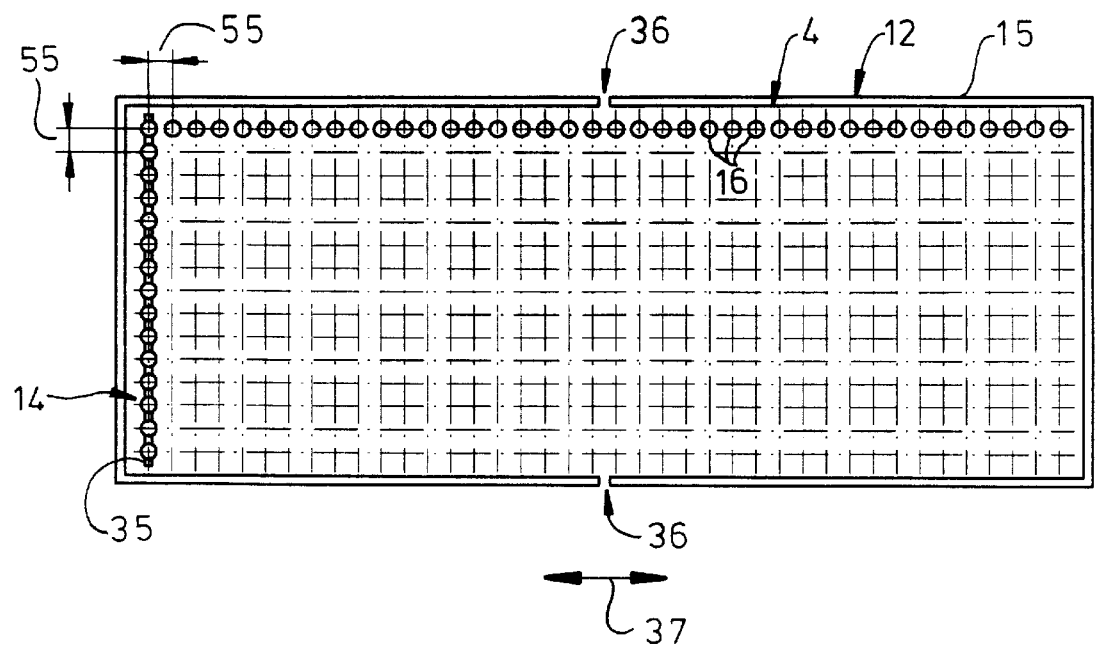
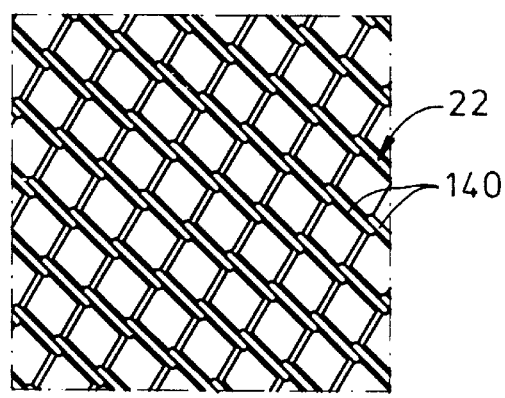
Fig. 18

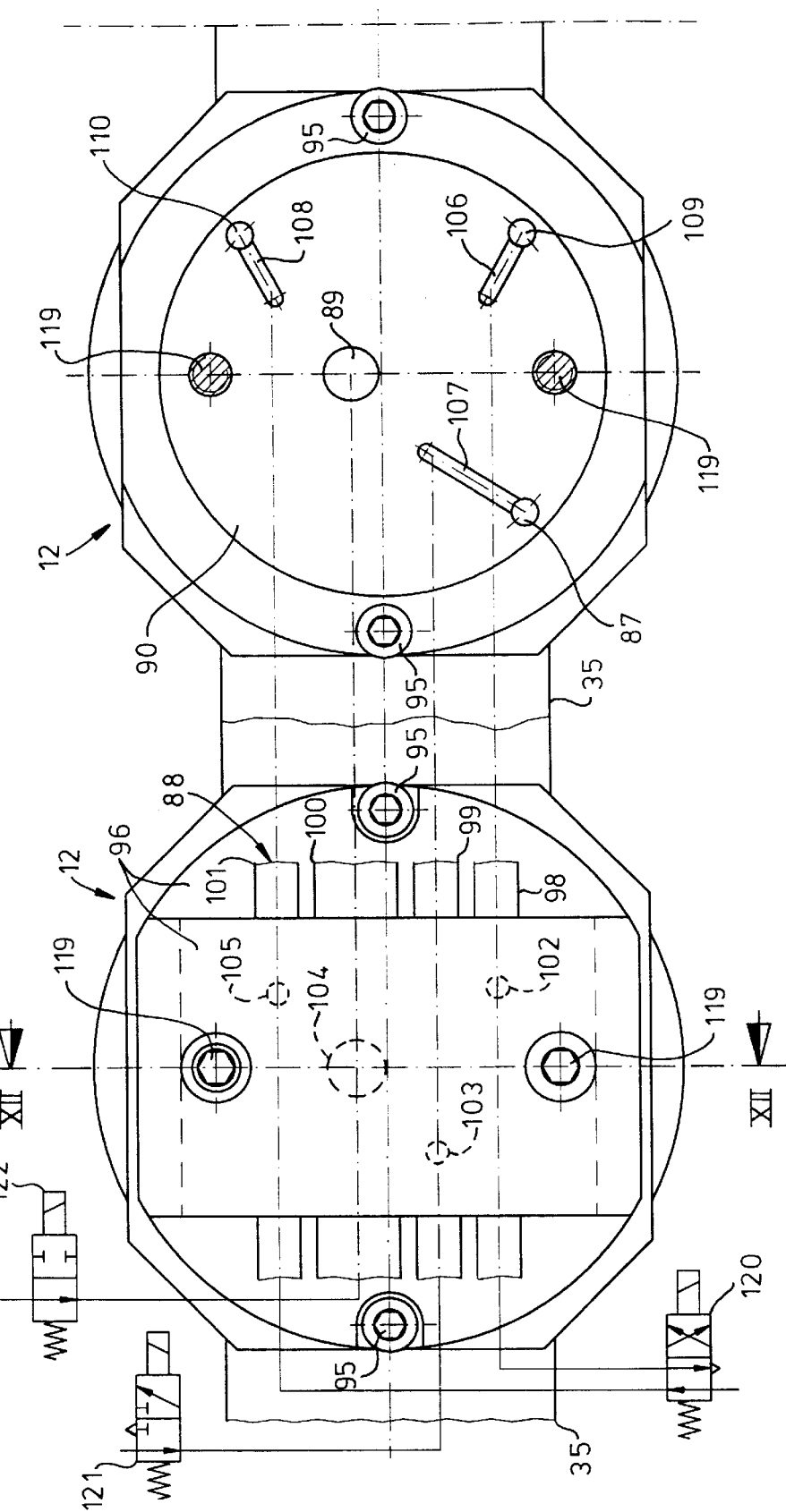

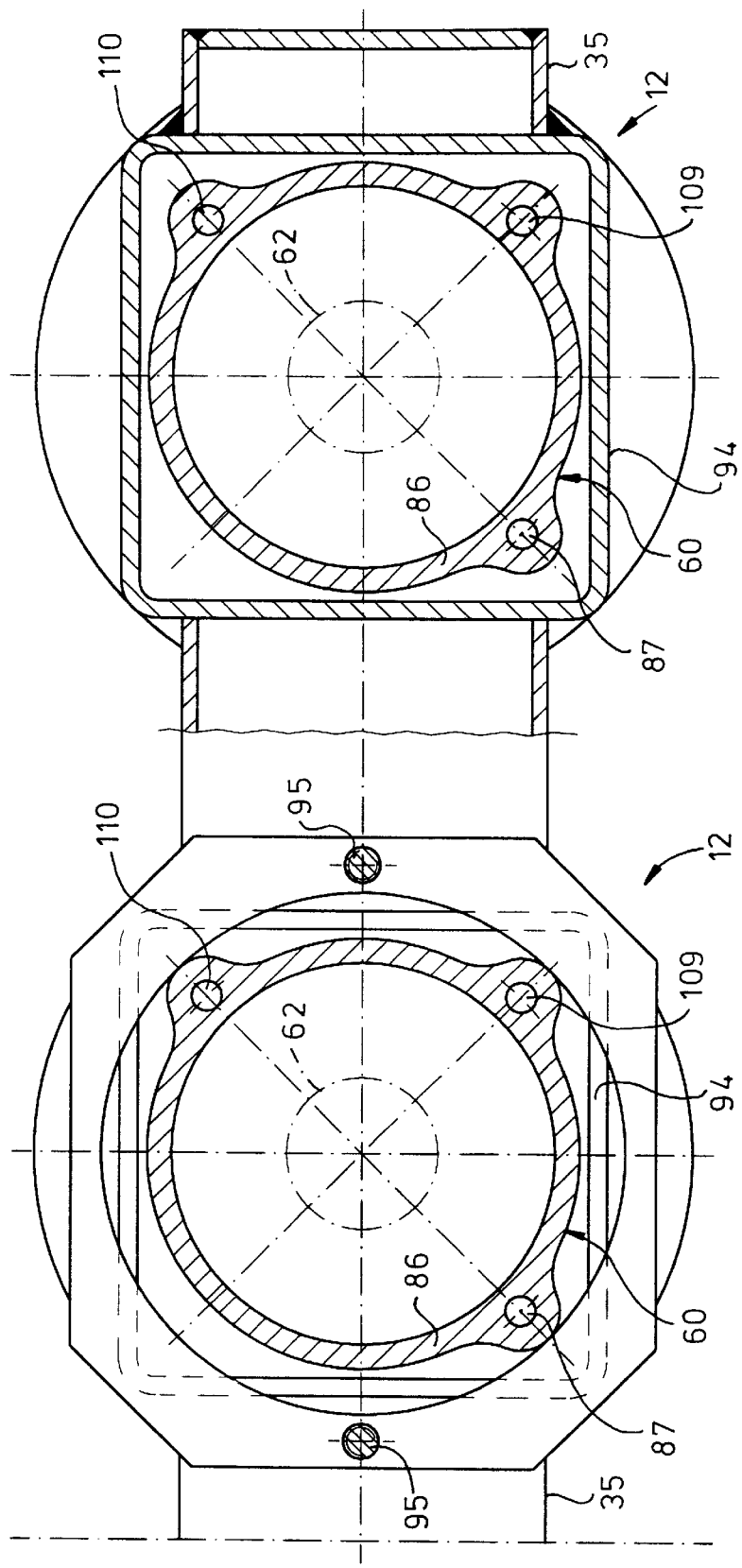

Fig. 12
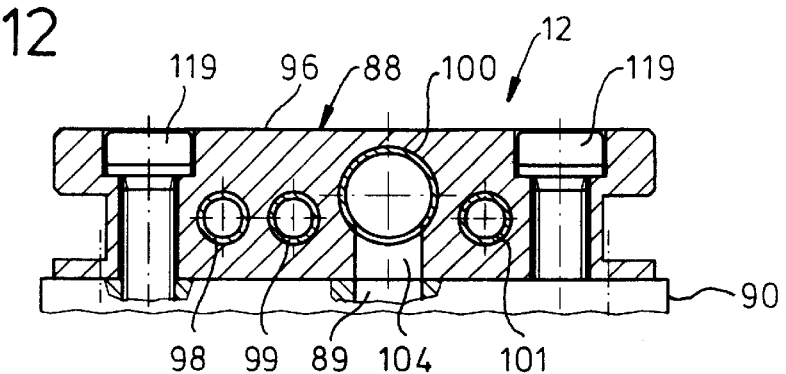
Fig. 13
Fig. 15
Fig. 14
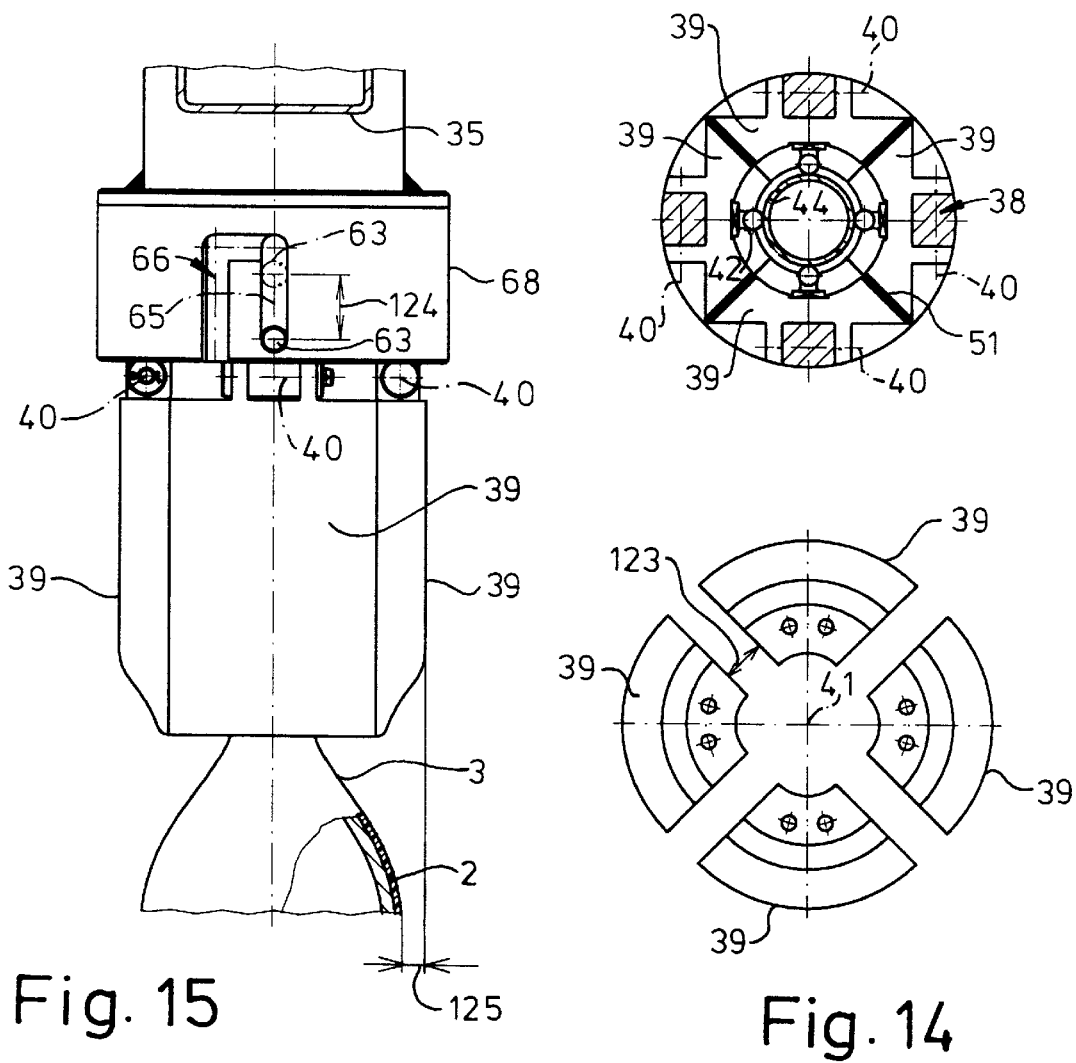

PROCESS AND DEVICE FOR COATING GLASS CONTAINERS AND COATED GLASS CONTAINERS

The invention relates to a process according to the preamble of claim 1, an apparatus according to the preamble of claim 15 and a glass container according to the preamble of claim 45.

In one known process of this type (EP 0 442 735 A2) numerous gripping devices are conveyed on a continuously circulating endless conveyor through a coating installation. Each gripping device grips a row of glass containers arranged transversely to the direction of conveyance at a pick-up site, guides the row upwards at an angle, and then downwards at an angle, with the result that the row is dipped into a bath of liquid coating material and subsequently is directed upwards again at an angle to an upper level. At this level the row passes through a bottle base setting zone, and is thereafter guided downwards at an angle and deposited on a conveyor belt. On the conveyor belt the row passes through a setting zone in order to harden the parts of the coating on the glass containers which have not yet been hardened. The emptied gripping devices are conveyed back to the pick-up site on the return run of the endless conveyor. All the devices are fixedly mounted on the endless conveyor and therefore move always each with the same velocity.

Also, from WO 94/17002 A1 it is known to guide numerous gripping devices on an endless conveyor through the coating installation. Each gripping device picks up from the lehr conveyor a row of glass containers arranged transversely to the direction of transportation. Each row is moved upwards at an angle, then downwards at an angle and dips into a bath of liquid coating material, and then after leaving the bath is guided initially on an upwardly sloping and then downwardly sloping path through a zone for the thermal ageing of the dip overlay, and then—again in sloping upward and downward movements—passes through a setting zone, and finally is again deposited on the lehr conveyor. Each gripping device comprises two gripping bars which respectively engage all the glass containers of the relevant group on opposing sides below the neck. The two gripping bars are opened or closed synchronously by a plurality of drive devices distributed over their length. Each drive device comprises a cylinder mounted on a base portion and part of a piston-cylinder unit whose piston rod carries at the lower free end, and parallel to the gripping bars, a rod which is guided in vertical slots of the base portion. Actuating arms of the gripping bars extend transversely to a longitudinal axis of the gripping bars and are each mounted on the rod to be pivotable upwards and downwards with an elongate hole about an axis of the base portion. Here again all the gripping devices circulate all with the same velocity.

From DE 26 55 411 A1 there is known another type of coating process. Here, a plurality of carriages are drivable independently of one another in a transportation plane on rail segments. Each carriage comprises a plurality of gripping units transversely to a direction of transportation. In a first gap between rail segments a holder picks up an empty carriage and pivots it downwards towards a pick-up site of a tempering device for bottles arranged in rows. There, the gripping units of the carriage grip a row of bottles. The holder is pivoted upwards together with the filled carriage in the first gap. From there, the carriage is caused to travel by way of a rail segment into a lifting mechanism which is waiting in a second gap. The lifting mechanism, together with the carriage, is lowered in the vertical direction until the bottles dip into a fluidized bed of thermoplastic powder. As soon as sufficient powder adheres to the bottles, the lifting mechanism is raised and the carriage with the coated row of bottles is displaced on a rail segment in the second gap. On this rail segment the carriage together with the row of bottles travels successively through a heating chamber, a ventilation chamber and a spray quenching chamber. Thereafter, the row of bottles is deposited at a delivery station by deactivation of the gripping units.

From the German published patent application 2 219 470 another coating process is known per se. Holders for respective individual bottles can be raised and lowered about a horizontal axis at intervals on a chain conveyor. The bottles are pre-heated in a raised position, then are lowered into a fluidized bed of plastics particles, and then are moved again in raised position through a melting oven.

From U.S. Pat. No. 4,022,155 A and German published patent application 2 310 923 it is known per se to swivel glass containers with a parallelogram-type handling device by gripping devices from a first conveyor belt through a coating station and after the coating process onto a second conveyor belt. The coating station comprises a fluidized bed into which the containers are dipped. The fluidized bed contains a thermoplastic polymer.

From U.S. Pat. No. 3,270,710 A it is known per se to coat a glass bottle first with a liquid primer and then with a liquid vinyl resin.

From U.S. Pat. No. 3,200,002 A it is known per se to coat bottles in a dipping process with a liquid plastisol, and for this to move gripping devices continuously with an endless conveyor chain.

From DE 26 17 976 B2 a special bell-shaped gripping unit is known per se. A longitudinally slotted spring sleeve is guided displaceably by means of a piston within a closed outer bell. On each tongue of the spring sleeve there is located at the bottom a gripping claw which is moved radially inwards into positive contact with the glass container by means of an abrasion-resistant ring upon axial relative movement between spring sleeve and bell. A plug which is connected rigidly to the bell is in contact with the top of the mouth or the closure of the glass container. A compression spring biasses the gripping claws into their gripping position. The gripping claws are guided by compressed air into their release position. The compressed air acts on the upper side of the piston of the spring sleeve.

From DE 24 31 952 C2 there is known per se a process for protecting glass bottles from shattering by the application of a plastics coating, in which the glass bottles are coated with a coating powder of softened duroplastic resin by dipping into a fluidized bed or an electrostatic fluidized bed, and the resin deposited to a thickness of at least 50 $\mu$m is thermally cured. In this way a coating is created which offers a good resistance to shattering as well as good strength and resistance to alkalis as well as having small frictional resistance, so that one thereby has a smooth transparent exterior surface as well as a product which is economical to manufacture.

The solution known from DE 25 10 734 B2 concerns a process for the coating of glass bottles with a transparent, duroplastic protective layer by the application of powdered lacquer in a fluidized bed or in an electrostatic fluidized bed. Primarily, one is talking here about pure glass bottles with an aqueous or alcoholic silane finish, dried and heated. The applied protective layer is very elastic, has excellent adhesion and resistance to alkalis and ensures a longer period of utilization for use as a multiple-use bottle.

From DE 27 48 696 A1 there is known a process for the coating of hollow glass bodies, in which a duroplastic powder varnish is used which is applied in a fluidized bed.

It is the object of the invention to improve the coating of the glass containers and to improve the coated glass containers themselves.

This object is achieved, in respect of the process, by the features of claim 1. By this means the handling device can be simplified and a trouble-free transportation of the glass containers is facilitated. Preferably, each group of glass containers is taken from the lehr conveyor of a lehr furnace which follows a glass forming machine. This permits the inherent thermal energy of the glass containers at the end of the lehr furnace to be utilized to the optimum, so that the coating medium is applied to the optimally tempered glass containers and subsequently hardens to a resistant protective layer. Preferably, the group is entrained in the direction of transportation of the lehr conveyor during the pick-up from the continually circulating lehr conveyor, and then is transferred to the vertical direction of movement. In this way the glass containers can be picked up smoothly and swiftly. The gripping devices are uncoupled from one another and can be moved on each section of the path with optimum velocity profile. This contributes well to the quality of the coating and consequently to the quality of the glass containers. The dipping time of the glass containers in the coating medium which is important for a uniform and—to save coating medium—as thin as possible formation of the layer can be maintained very accurately.

According to claim 2, the carry-over of residual coating medium beyond the set-down plate can be substantially reduced or eliminated.

According to claim 3, one has a particularly rapid and cost-effective manner of operation.

The features of claim 4 are recommended if the layer is to be set first on the bottom of the glass containers, before the glass containers are deposited on the conveyor belt.

The features of claim 5 lead to an overall favorable motion characteristic for the glass containers.

The service station according to claim 6 is visited by the gripping device either in each operating cycle or only as needed.

The features of claim 7 offer a structural and operational simplification.

According to claim 8, a rapid exchange of the containers is possible even within the normal operating cycle.

According to claim 9, the other gripping devices are moved in a separate closed path.

Preferably, a bottom hardening takes place with the glass containers stationary. A heating by thermal radiation can be effected not only from below, but at any suitable angular orientation of a heating arrangement relative to the bottom of the containers.

According to claim 10, the glass containers can be sprayed for example with a friction-reducing liquid solution, for example with a cold-end coating process known per se.

According to claim 11, one has a uniform and easily controllable coating process. Alternatively, the powder could be applied to the glass containers by an electrostatic coating process known per se.

The features of claim 12 lead to a particularly favorable coating of the glass containers. Glass containers made in this way are suitable to take filling products under increased internal pressure, for example drinks containing carbon dioxide. For example, powder having a grain size of 5 to 60 $\mu$m is used.

According to each of claims 13 and 14 one achieves a particularly smooth exterior surface of the coating.

The aforementioned object of the invention is achieved, in respect of the apparatus, by the features of claim 15. As tempering device one can use for example the lehr oven which follows a glass molding machine. Before the pick-up by the gripping device, the glass containers can be completely uncoated or be provided just with a hot-end coating known per se. In particular, the carrier can be made substantially rectangular. The group is then for example a rectangular matrix of 15 rows and 40 columns, thus a total of 600 glass containers, with all the glass containers being arranged spaced from one another. The group can be simply and reliably set down on the conveyor belt after the coating process. The setting of the coating on the conveyor belt is effected particularly uniformly and is easily controllable. As necessary, the base setting zone for the base coating of the glass containers is provided if it appears necessary to carry out such base setting in advance before the glass containers are deposited on the conveyor belt. Each gripping unit is preferably provided with four gripping elements. This gives the possibility, with an arrangement of the gripping units in a predetermined matrix, of moving the gripping elements with minimum spacing of the gripping units from one another into suitable intermediate spaces between the gripping units. The piston-cylinder unit is preferably double-acting and is actuated pneumatically. Instead of an upward and downward pivoting of the gripping elements, these could alternatively be actuated in such a manner that they are moved linearly in relation to the rest of the gripping unit.

According to claim 16, substantially no coating medium adheres to the other gripping device, which medium could otherwise harden in particular in a base setting zone and contaminate the gripping device and adversely affect its function.

According to claim 17, the coating medium is prevented from getting into the interior space of the gripping elements in the gripping position.

According to claim 18, the gripping elements can be particularly easily moved and in a functionally reliable way.

According to claim 19 it is ensured that in the absence of pressurized medium the gripping elements are closed into their gripping position.

The features of claim 20 make it possible to balance the gripping unit for the case where the mouth of a glass container is arranged very eccentrically to an impermissible degree and an opened gripping element strikes against the mouth of the container upon lowering of the gripping unit.

According to claim 21, the gripping unit is continuously biased into the normal operating position.

The features of claim 22 offer particularly simple safety against rotation.

According to claim 23, the gripping unit can be exchanged rapidly, as necessary.

The features of claim 24 fulfil a double function. On the one hand, in normal operation the mouth of the glass container is sealed off by the plug, and thus an undesirable penetration of coating medium into the glass container is prevented, and on the other hand the plug seals off the lower gripping aperture of the gripping elements when located in the gripping position if no glass container should be located below this gripping unit on any occasion. Thus, again, in the latter case, coating medium is prevented from getting into the interior of the gripping unit.

The features of claim 25 ensure that the plug can fulfil its function even in the absence of the relevant pressurized medium.

The pressurized medium according to claim 26 is preferably compressed air at for example 3 bar.

According to claim 27, air at a pressure of for example 4900 Pa (500 mm water head) is used as flushing gas. The flushing gas on the one hand cools the gripping unit and prevents or reduces in this way the tendency of coating medium to stick to the gripping unit. Additionally, by means of the flushing gas, an excess pressure is created in the interior space of the gripping unit, with the result that the penetration of coating medium into the gripping unit is made more difficult or is prevented.

According to claim 28, one has a structural and operational simplification. In terms of the number of gripping units one is talking here preferably about several gripping units of a column in the predetermined matrix. Such a column comprises for example 15 gripping units arranged spaced from one another.

The features of claim 29 are constructionally very favorable.

According to claim 30, coating medium possibly falling from the gripping elements is prevented from falling onto the glass containers suspended by the gripping elements, which could lead to a non-uniform coating.

According to claim 31, one achieves a particularly uniform and economical coating. More than one vessel can be used if the operational circumstances require this.

The vessel according to claim 32 ensures a reliable coating operation. The air chamber is preferably divided into cells in order to ensure that the air supply over the cross sectional surface area of the fluidized bed is as uniform as possible. The porous plate is of such porosity that the air is able to travel upwards from below, but that powder particles cannot pass through the plate. The porous plate is made for example as a bronze or plastics sintered plate.

The cullet basket according to claim 33 means that glass containers or cullet which has fallen into the fluidized bed can be removed easily again from the fluidized bed.

According to claim 34, the surroundings of the vessel can be maintained free from the residual powder in an effective way.

The features of claim 35 can lead to constructional simplifications in comparison to using powder as coating medium.

The features of claim 36 offer operational advantages. The dipping depth of the gripping units should be kept as small as possible, so that as little coating medium as possible sticks to the gripping units and can pass into the glass containers and the surroundings.

According to claim 37 there results a particularly rapid and reliable coating. For example, the velocity can be kept constant on the one hand when dipping the glass containers, shortly before the contact of the surface of the coating medium by the base of the glass containers, and on the other hand when raising the glass containers shortly before the bases of the containers rise again from the surface. In particular, this should prevent coating medium from being excessively agitated and distributed in an uncontrolled manner into the surroundings by the dipping and raising movements of the glass containers and of the gripping units.

By means of the features of claim 38 residues of the coating medium can be collected and possibly returned to the process.

The heating device according to claim 39 can be for example an electrical resistance heater with a circular heating plate or it can be formed as an annular gas burner.

According to claim 40 on the one hand heat energy is spared, and on the other hand an undesirable heating of the relevant gripping units can be reduced.

The features of claim 41 are particularly recommended if the base coating has not set before the glass containers are set down on the conveyor belt. The conveyor belt can be made for example similar to a wire mesh.

According to claim 42, sticking of the bases of the glass containers to the conveyor belt can be prevented or greatly reduced. The separating means can for example be sprayed on to the conveyor belt as a liquid.

The features of each of claims 43 and 44 offer a better utilization of space and protection against uncontrollable tipping over of glass containers.

The aforementioned object of the invention is achieved in respect of the glass container itself by the features of claim 45. By these means it is possible significantly to reduce the glass mass and consequently the wall thickness of the glass containers as compared with the prior art. Any such reduction leads to considerable economical advantages. The thickness of the coating can be 30 to 60 $\mu$m.

According to claim 46, the powder lacquer coating can, as required, be glossy, transparent, smooth, glass-clear, colored, or be formed in some other way. The at least approximately duroplastic powder lacquer layer represents excellent protection against damage to the exterior surface of the glass. Thus, it is possible to preserve the strength of the glass during use of the glass containers.

Substantially the same advantages and, in addition, a particularly smooth exterior surface of the coating results from claim 47.

The features of each of claims 48 to 62 illustrate the possible savings in glass mass which can be achieved with examples of glass containers available on the market.

These and other features and advantages of the invention will now be described in more detail with reference to embodiments which are given by way of example and which are shown in the drawings. In the drawings:

BRIEF DESCRIPTION OF THE DRAWINGS

FIG. 4 is the view taken along the line IV—IV in FIG. 1 on an enlarged scale,

FIG. 8 is the view taken along the line VIII—VIII in FIG. 5, FIG. 9 is the view taken along the line IX—IX in FIG. 5, FIG. 10 is the sectional view taken along the line X—X in FIG. 5, FIG. 11 is the sectional view taken along the line XI—XI in FIG. 7, FIG. 12 is the sectional view taken along the line XII—XII in FIG. 8, FIG. 13 is the sectional view taken along the line XIII—XIII on a reduced scale, FIG. 14 is the view taken along the line XIV—XIV in FIG. 6, FIG. 15 is the sectional view taken along the line XV—XV in FIG. 5, FIG. 18 is the plan view of a part of a conveyor belt carrying one of the coated glass containers.

FIG. 1 shows an apparatus 1 for the application of a coating 2 (FIG. 15) to a part of the exterior surface of glass containers 3. The glass containers 3 are manufactured in a glass forming machine which is not shown and are pushed onto a lehr belt 5, for example in 40 parallel columns 4 (FIG. 4). An upper run of the endless lehr belt 5 moves continuously in a direction of transportation 6. The lehr belt 5 travels first through a lehr 7 up to an exit end 8 of the lehr 7 and then travels to a reversing point 9, from which it is guided back to the entry end of the lehr 7.

Figure 1:
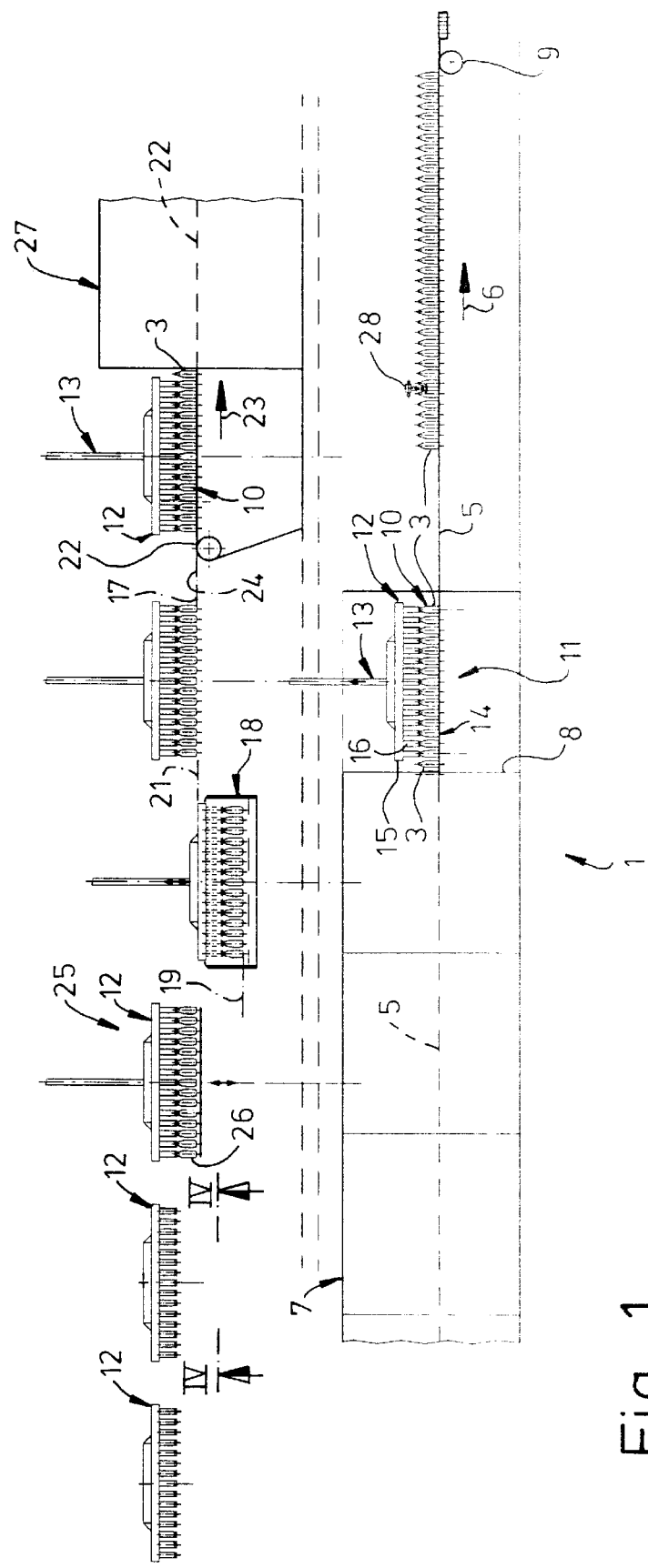
FIG. 1 is a schematic side view of a first embodiment of the coating apparatus.

In talking here about glass containers 3, reference is particularly made to bottles which are provided before their entry into the lehr 7 with a so-called hot-end coating. By this is meant the application of a tin oxide layer or tin dioxide layer which is applied in the gaseous phase to the glass containers 3. This is effected generally by the so-called CVD (chemical vapor deposition) process. The hot-end coating has inorganic properties. On this oxidized surface layer the subsequently applied coating, applied in accordance with the invention, sticks just as well as to the likewise oxidized bare glass surface which would be provided without previous hot-end coating. In accordance with the invention, both glass containers 3 with hot-end coating and also glass containers 3 without hot-end coating can be coated with the same results.

The lehr 7 constitutes a tempering device at whose exit end 8 the glass containers 3 all have the same temperature as far as possible, in the range of 100 to 160° C.

Immediately following the exit end 8 of the lehr 7, a group 10 of the glass containers 3 is gripped at a pick-up site 11 by a gripping device 12 of a handling device 13. During this gripping process the lehr belt 5 continues to travel in the direction of transportation 6. Because of this, the handling device 13 during the pick-up of the group 10 from the lehr belt 5 receives a superimposed movement in the direction of transportation 6 in a manner not shown and also upwards. Thus, the group 10 can be picked up without the glass containers 3 which are following on on the lehr belt 5 thereby being adversely affected.

In the illustrated embodiment, the group 10 consists of a matrix of 40 columns 4 (FIG. 4) and 15 rows 14, thus making a total of 600 glass containers 3. The gripping device 12 comprises a carrier 15 which is movable along a path of the handling device 13 which is not shown in detail. On the carrier, for each glass container 3 of the group 10, there is arranged a gripping unit 16 whose individual parts will be described later in connection with FIGS. 5 to 15.

From the pick-up site 11 the group 10 is raised by the handling device 13 in a substantially vertical direction to a first level 17, then is transported horizontally as shown in FIG. 1 to the left over a vessel 18, and finally is lowered in the vertical direction into the vessel 18 to a second level 19. The vessel 18 contains a powder as coating medium for the glass containers 3 and, with this powder, constitutes a fluidized sintering bed.

Normally, the gripping units 16 grip around a mouth 20 (FIG. 5) of the associated glass containers 3 and prevent the mouth 20 from being coated with the powder. In order to ensure a complete coating of the rest of the glass containers 3, not only the glass containers 3 but also a lower region of the gripping units 16, to a maximum depth for example of 20 mm, is dipped into the powder in the vessel 18. The dipping time amounts for example to >0 second to <5 seconds, until sufficient powder has stuck to the heated exterior surface of the glass containers 3. The group 10 is then raised by the handling device 13 from the second level 19 to a third level 21 and then is transported in the horizontal direction, to the right in FIG. 1, by means of a conveyor belt 22. Preferably, the third level 21 is made the same as the first level 17.

Figure 16:
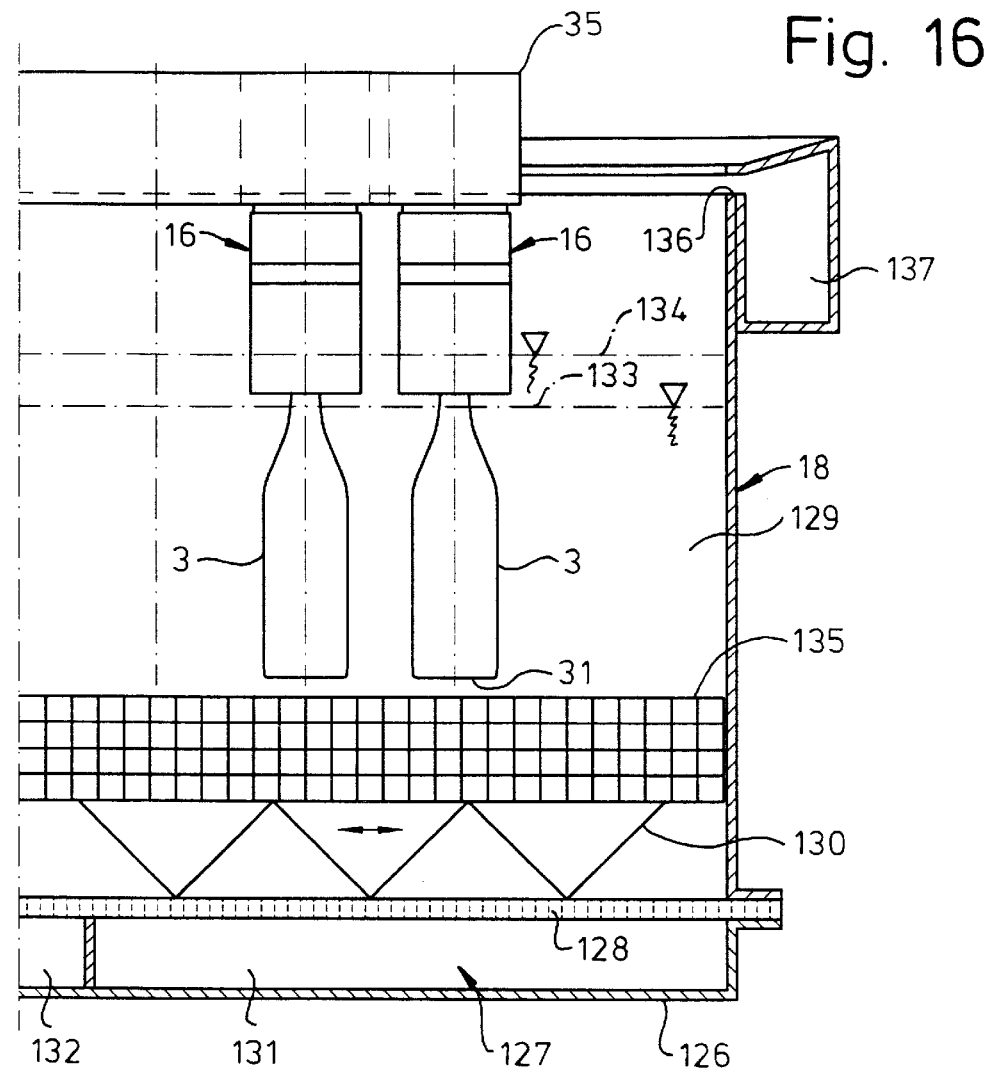
FIG. 16 is a longitudinal sectional view through an edge region of a fluidized bed.

An upper run of the conveyor belt 22 runs preferably continuously in a transportation direction 23 which is usually parallel to the transportation direction 6 of the lehr belt 5. Preferably, the handling device 13, in this delivery position above the conveyor belt 22, moves not only in the vertical direction but also in a superimposed manner in the transportation direction 23, while the gripping device 12 is deactivated and the group 10 is transferred to the conveyor belt 22. In this way, the glass containers 3 are delivered in a stable manner to the conveyor belt 22. At this delivery position, a suction device (not shown) can be provided for surplus adhering coating medium. Before accepting the glass containers 3, the conveyor belt 22 can be provided in a manner not shown with a separating means which reduces or prevents sticking of the bases 31 of the containers (FIG. 16).

The gripping device 12 emptied of the glass containers 3 is carried back at a fourth level 24 in the horizontal direction, to the left in FIG. 1, to a position above the pick-up site 11, and then is lowered again in the vertical direction to the pick-up site 11 in order to receive a new group 10.

Alternatively, the emptied gripping device 12 can be conveyed back at a fourth level 24 in the horizontal direction beyond the pick-up site 11 out to a service station 25. In the service station 25 maintenance, as necessary, can be carried out, such as the cooling of the gripping device 12, the cleaning of the gripping device 12 of adhering coating medium or the release of rejected containers 26. In the service station 25 the gripping device utilized up to that point can also be replaced by a new gripping device 12. Two such new gripping devices 12 are shown in FIG. 1 to the left of the service station 25 in a stand-by position.

The coated glass containers 3, received by the gripping device 12, are conveyed by the conveyor belt 22 in the transportation direction 23 into a setting zone 27 which is formed as a tunnel-like setting oven. In the setting zone 27 the powder layer on the glass containers 3 is hardened, for example for 10 minutes at about 180 to 220° C. After this, the glass containers can be cooled to about 80° C. and then be provided with a cold-end coating known per se.

The apparatus 1 according to FIG. 1 also offers the alternative possibility of not coating the glass containers, if desired or in the case of faults in the powder coating installation, with powdered lacquer. In this case, the gripping device 12 remains inactive at the pick-up site 11, so that the glass containers 3, as is indicated in FIG. 1 at the right-hand bottom corner, travel further on the lehr belt 5 and there are provided with a conventional cold-end coating by a coating device 28 known per se.

The fourth level 24 can be made the same as the first level 17.

In all the Figures of the drawings the same or corresponding parts are shown with the same respective reference numbers.

Figure 2:
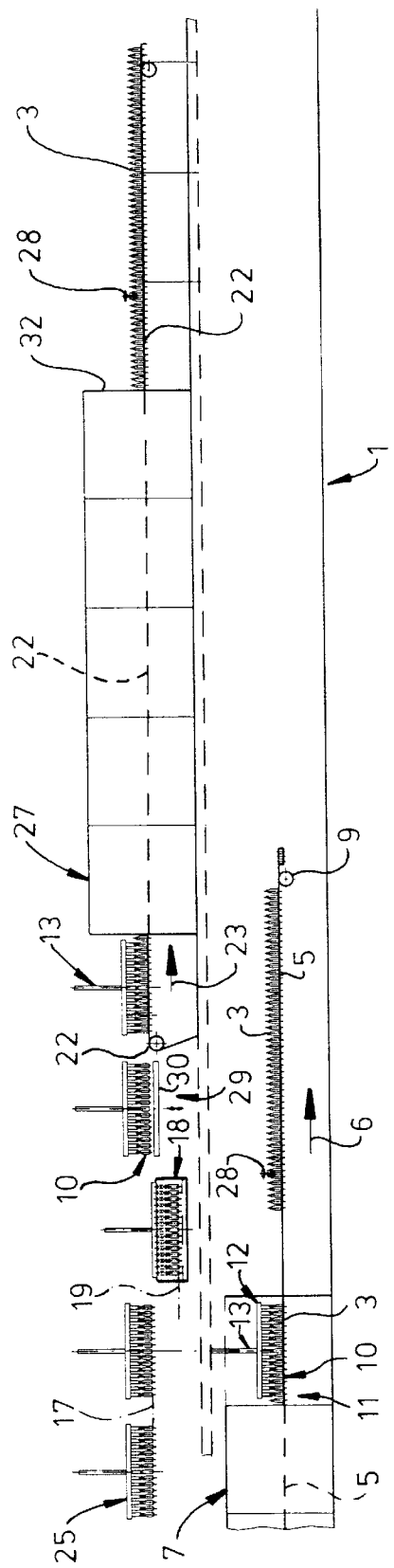
FIG. 2 is a schematic side view of another embodiment of the coating apparatus.

In the embodiment of the apparatus 1 shown in FIG. 2 the group 10 of the glass containers 3 is raised in the same way at the pick-up site 11 from the lehr belt 5 by the handling device 13 as according to FIG. 1. From the first level 17 the group 10 is then instead not moved to the left in FIG. 2 but to the right in the horizontal direction until it is positioned above the vessel 18. Then, the group 10 is dipped in the same way into the vessel 18 and is again raised from the vessel as in FIG. 1. After being lifted from the coating medium in the vessel 18, the group 10 is conveyed in the horizontal direction to the right in FIG. 2 into a base setting zone 29. In the first base setting zone 29 a heating register 30 is arranged in a stationary position below the group 10. By means of the heating register 30 substantially only the layer 2 (FIG. 15) on the bases 31 (FIG. 16) of the glass containers 3 is hardened. This hardening lasts for example for a maximum of 40 seconds and preferably takes place at the first level 17 (FIG. 1).

Following the base hardening in the first base setting zone 29, the group 10 is conveyed by the handling device 13 in the horizontal direction to the right in FIG. 2 by means of the conveyor belt 22. The group 10 is deposited in the same way on to the conveyor belt 22 as has been described in relation to FIG. 1. There then follows the hardening of the rest of the layer 2 (FIG. 15) in the setting zone 27 which again is formed as a tunnel-like setting oven. Beyond an exit end 32 of the setting zone 27 the coated glass containers 23 cool off and are subsequently provided by the coating device 28 with a cold-end coating known per se.

Such a cold-end coating can be carried out on the glass containers 3 following the pick-up site 11, in a manner analogous to that of FIG. 1, if the containers travel further on the lehr belt 5 without powdered lacquer coating.

Figure 3:
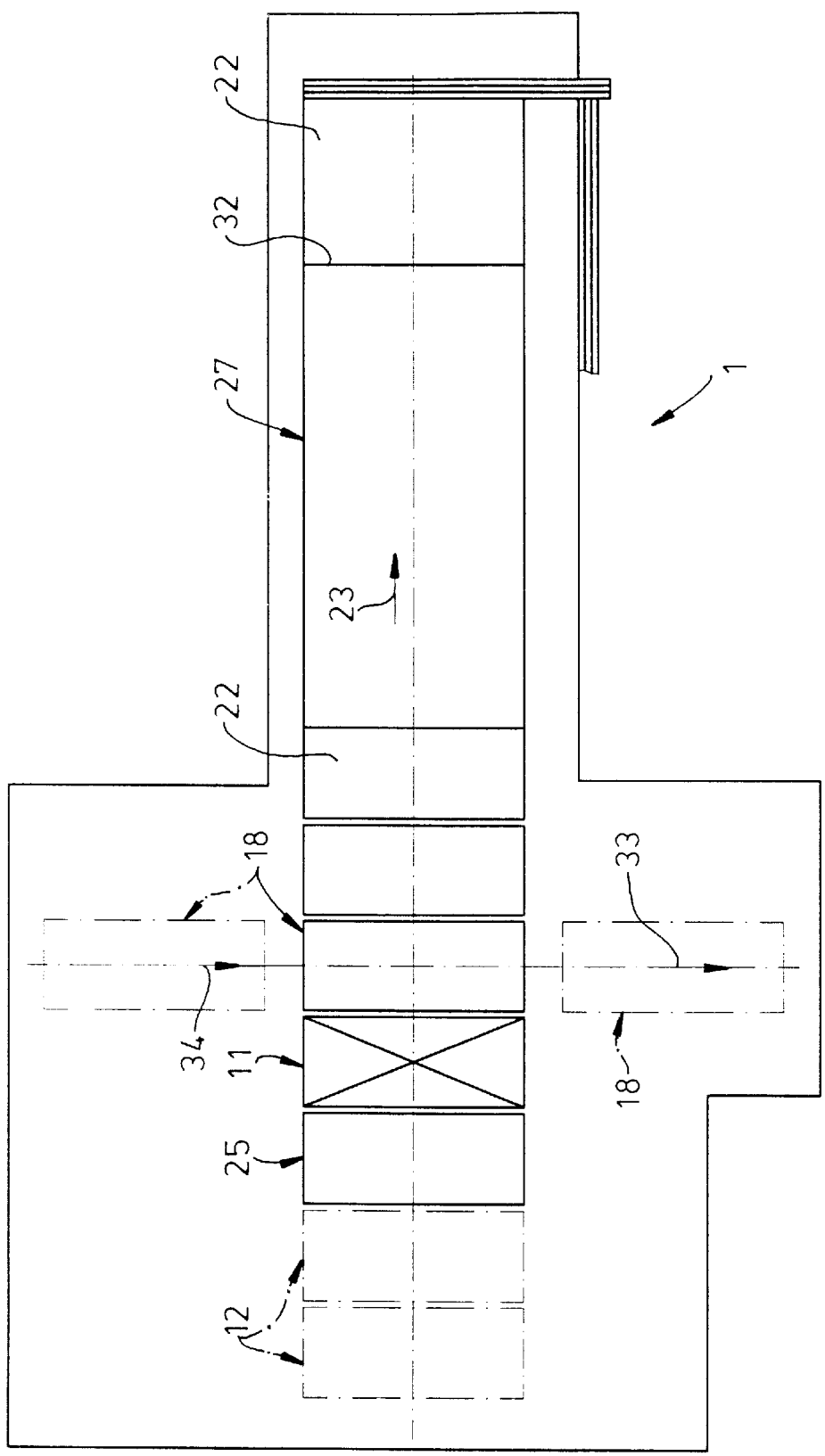
FIG. 3 is the plan view of the apparatus shown in FIG. 2.

FIG. 3 shows a plan view of the apparatus 1 of FIG. 2 in a schematic representation. When the vessel 18 has to be exchanged for repair or maintenance purposes, it is moved out sideways from its operating position in the direction of the arrow 33. A fresh, ready-prepared vessel 18 is then brought into the operating position from the opposite side in the direction of the arrow 34. Thus, the exchange of the vessel 18 can be carried out with the minimum loss of time.

FIG. 4 shows the view of the gripping device 12 from below. It will be appreciated that in this case 600 gripping units 16 are arranged on the carrier 15 in matrix array in columns 4 and rows 14: Tubular cross-ties 35, of which only one is shown in FIG. 4, are components of the carrier 15. Each one of these cross-ties 35 is associated with a column 4 of in this case 15 gripping units 16, and carries these gripping units 16. In the embodiment according to FIG. 4, the carrier 15 has a division 36 at its longitudinal center. The division 36 serves to separate the two halves of the gripping device 12 thereby created, in the direction of the double arrow 37, before each half of the gripping device 12 is lowered into, in this case, its own separate vessel (not shown) with coating medium. These two vessels are set with their end walls in contact with each other or have a common end wall, so that the two halves of the gripping device 12 only need to be moved apart sufficiently for the separating wall between the two vessels to be passed by the two halves. After the lifting of the two halves of the gripping device 12 from the fluidized beds the halves of the gripping device 12 are brought together again, so that they contact each other at the division 36 and are locked together for the onward movement. The carrier 15 can in similar manner have more than one such division 36. The number of vessels 18 would then increase correspondingly.

Figure 5:
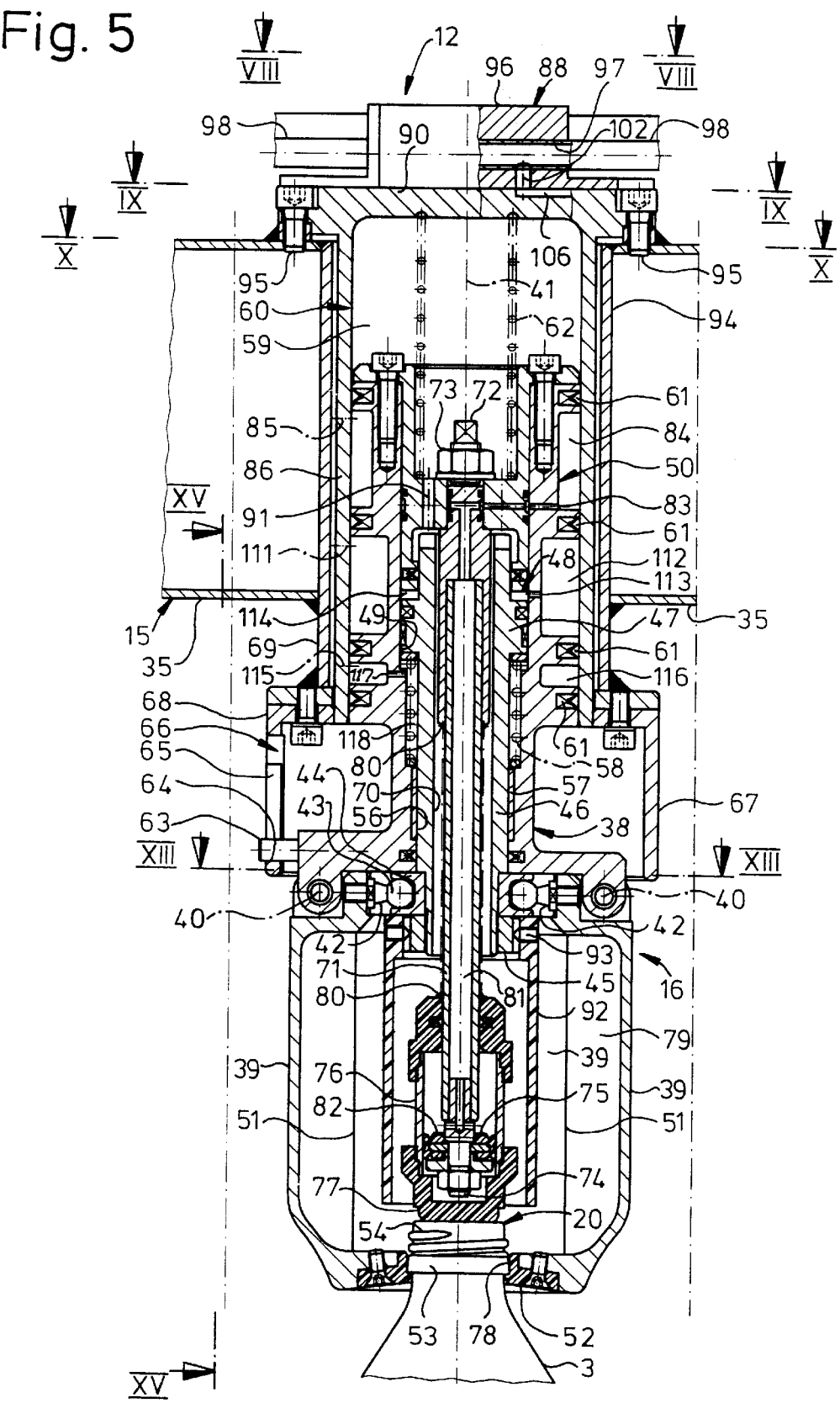
FIGS. 5, 6 and 7 are longitudinal sectional views through a gripping unit of the apparatus in respective different operational situations.

FIG. 5 shows details of the gripping device 12 and in particular one of the gripping units 16 which is formed in the same way.

Each gripping unit 16 comprises a base portion 38 on which in this case four gripping elements 39 are mounted to be raised and lowered each about an axis 40. Each gripping element 39 is provided with an actuating arm 42 which extends towards the longitudinal axis 41 of the gripping unit 16. Each actuating arm 42 has at its free end a ball head 43 which engages in a radially outwardly opening groove of an actuating ring 44. The actuating ring 44 is fixed by a nut 45 to a piston rod 46 of a piston 47 of a piston-cylinder unit 48. The piston 47 slides in a cylinder 49 which is formed in an upper piston part 50 of the base portion 38. Alternatively, the gripping elements can be movable linearly between their gripping and release positions in a manner not shown.

Each gripping element 39 is formed in the manner of a segment and cooperates sealingly in a gripping position shown in FIG. 5 with the other gripping elements 39 along joints 51 and the associated glass containers 3. At the lower end each gripping element 39 carries a gripping insert 52 which is screwed into place and which, in the gripping position shown in FIG. 5, lies below and against a safety ring 53 of the mouth 20 in a shape-locking and sealing manner. Above the circumferential safety ring 53 each mouth 20 is provided in the usual way with an external thread 54 for the fitting of a closure cap which is not shown. The gripping inserts 52 lie in sealing contact with one another in the plane of the joints 51 and also in the circumferential direction, when the gripping elements 39 are located in the gripping position shown in FIG. 5.

The arrangement of three and more gripping elements 39 per gripping unit 16 has a special advantage. If the mouth 20 of the associated glass container 3 is not arranged concentrically with respect to the longitudinal axis 41 of the gripping unit 16, before the mouth 20 is gripped by the gripping elements, a centering of the mouth 20 onto the longitudinal axis 41 can be effected by the gripping elements 39 within predetermined tolerances. The special advantage is that this can be carried out with three and more gripping elements 39 for eccentricities of the mouth 20 which occur in any radial direction. Such eccentricities can have several causes. For one, the normally straight glass container 3 can have its base 31 (FIG. 16) eccentrically positioned. For another, a glass container 3 which has its base exactly positioned can be skewed, so that its mouth 20 deviates from the ideal concentric position. In order to make allowance for such circumstances the matrix according to FIG. 4 has a sufficiently large raster size 55 of for example 128 mm in both coordinates.

In FIG. 5 the piston rod 46 is guided in the radial direction in a bore 56 of the base portion 38 through a guide sleeve 57. Between the base portion 38 and the piston 47 there is arranged a spring 58 which biasses the gripping elements 39 into their gripping position.

The upper piston part 50 is displaceable in a main cylinder 60 with the creation of a cylinder chamber 59 and is guided in sealing manner by seals 61. Between the upper piston part 50 and the main cylinder 60 there is arranged a spring 62 biassing the upper piston part 50 into a lowermost position, shown in FIG. 5. This lowermost position is defined by a pin 63 of the base portion 38, with the lower end 64 of the pin engaging in a longitudinal slot 65. The longitudinal slot 65 is a component of a bayonet link 66 (see also FIG. 15) for the pin 63, permitting a rapid assembly and dismantling of the gripping unit 16. The bayonet link 66 is formed in a side wall 67 of a cup 68 which is screwed on to a lower extension 69 of the cross-tie 35.

The piston rod 46 has a concentric aperture 70 therethrough, through which a further piston rod 71 extends.

A free, upper end 72 of the further piston rod 71 can be fixed by a nut 73 to the upper piston part 50 of the base portion 38. A lower end 74 of the further piston rod 71 carries a further piston 75 at the level of the gripping elements 39. A further cylinder 76 is guided displaceably on the further piston 75 and the further piston rod 71 and at the bottom carries a plug 77. The plug 77 cooperates either with the mouth 20 of the glass container 3 in the manner which can be seen from FIG. 5, or else the stop 77 is seated sealingly in the central aperture 78 of the gripping inserts 52 when the gripping elements 39 are located in their gripping position shown in FIG. 5 but with no glass container 3 being gripped. It can happen that in the matrix of a group 10 of the glass containers 3, glass containers 3 will be missing here and there. In this case the plug 77 ensures that coating medium does not pass into an internal chamber 79 of the associated gripping elements 39.

Figure 7:
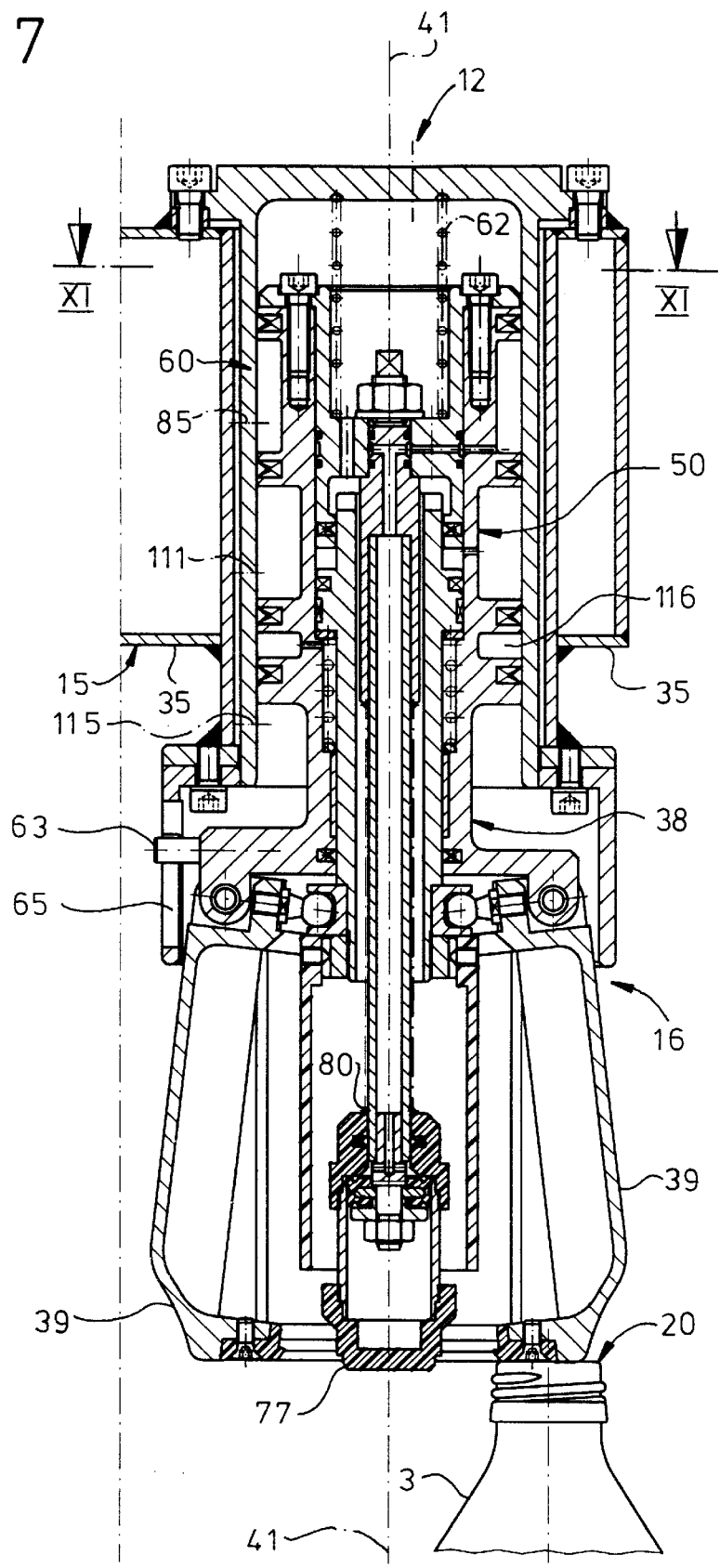

Between the further cylinder 76 and the further piston rod 71 there is arranged a spring 80 which biasses the plug 77 into a lowermost position as indicated in FIG. 7. The further piston rod 71 has a hollow chamber 81 through which compressed air can be introduced to an upper side 82 of the further piston 75 in order to lift the further cylinder 76. This compressed air comes through a connecting passage 83 from an annular chamber 84 of the upper piston part 50. The annular chamber 84 is in permanent communication with an axially parallel connecting passage 87 (FIGS. 10 and 11) in the side wall 86 by way of an aperture 85 in the side wall 86 of the main cylinder 60 which is shown only schematically in FIG. 5.

With depressurization of the hollow chamber 81, the plug 77 is returned to its lowermost position by the force of the spring 80.

A flushing gas, especially flushing air, at an increased pressure, can be introduced into the cylinder chamber 59. The flushing gas comes from a supply device 88 through a bore 89 (FIG. 9) in an uppermost end wall 90 of the main cylinder 60 and into the cylinder chamber 59. From the cylinder chamber 59 the flushing gas passes through for example six passages 91 distributed around the upper piston part 50 into the aperture 70 of the piston rod 46 and from there into the internal chamber 79 of the gripping elements 39. As necessary, a guide sleeve 92 is arranged in the internal chamber 79 outside the further cylinder 76, which conducts the flushing air downwards to the mouth 20 and to the sealing region between the mouth 20 and the gripping inserts 52. The guide sleeve 92 is fixed by grub screws 93 to the nut 45. By means of the flushing air, a certain excess pressure as compared with the ambient pressure is created in the internal chamber 79. In this way the penetration of coating powder into the internal chamber 79 is made more difficult or is prevented.

The main cylinder 60 is inserted into a substantially rectangular receiving tube 94 of the cross-tie 35. The end wall 90 is fixed radially outwardly to the cross-tie 35 by screws 95.

The supply device 88 includes a bridge 96 for each gripping unit 16. Through each bridge 96 there extends, in the horizontal direction, four parallel bores 97 in which respective tubular pipes 98 to 101 (FIGS. 8 and 12) are sealingly soldered. Each of the pipes 98 to 101 communicates from the underside of the bridge 96 with a connecting bore 102 to 105 (see also FIGS. 8 and 12). The connecting bore 104 is aligned with the bore 89 (FIG. 9). The connecting bores 102, 103 and 105 (see also FIG. 8) are aligned respectively with branch passages 106 to 108 (see also FIG. 9) formed in the end wall 90. The branch passage 106 issues into an axially parallel connecting passage 109 (FIGS. 9 to 11), the branch passage 107 issues into the connecting passage 87, and the branch passage 108 issues into an axially parallel connecting passage 110 (FIGS. 9 to 11).

The connecting passage 109 is connected permanently to an annular chamber 112 in the upper piston part 50 by way of an opening 111 in the side wall 86 which is shown only schematically in FIG. 5. The annular chamber 112 is in permanent communication with a cylinder chamber 114 above the piston 47 by way of a connecting passage 113.

The connecting passage 110 is in communication with an annular chamber 116 in the upper piston part 50 by way of an aperture 115 in the side wall 86 shown only schematically in FIG. 5 only when the base portion 38 is located in its lowermost position shown in FIG. 5. The annular chamber 116 is in permanent communication with a cylinder chamber 118 at the underside of the piston 47 by way of a connecting passage 117. Because of the axially comparatively short annular chamber 116, this ensures that then, when the base portion 38 is not located in its lowermost position, no pressure force is exerted on the underside of the piston 47 by pressurized medium.

Between each bridge 96 and the associated end wall 90 there is a surface seal (not shown in the drawings for the purpose of simplification) which is held in position by screws 119 (FIGS. 8, 9 and 12). The screws 119 penetrate the bridge 96 and are inserted (FIG. 12) into threaded bores in the end wall 90.

Figure 6:
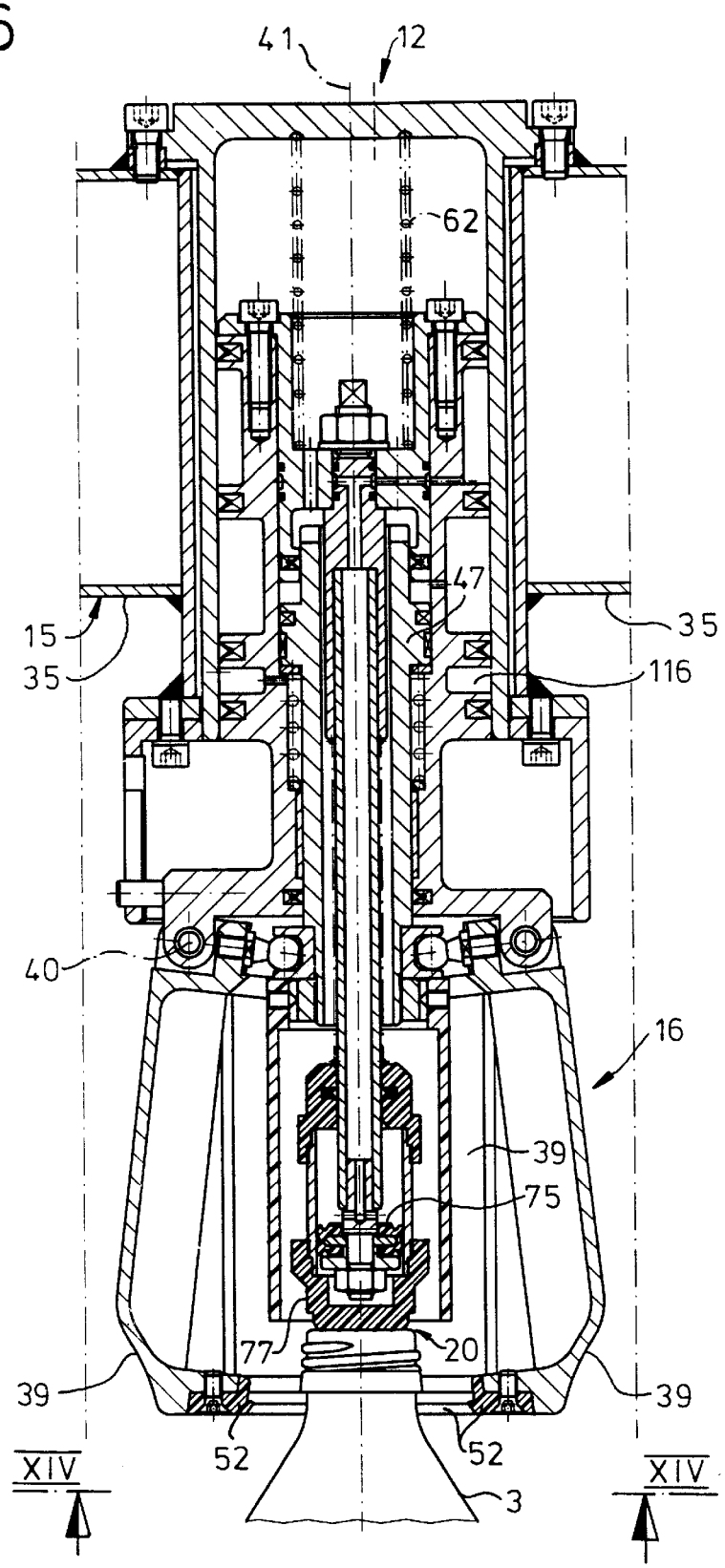

FIG. 6 shows a gripping unit 16 with the gripping elements 39 in their release position. The gripping elements adopt this release position before the glass containers 3 are taken from the lehr belt 5, and again later, when the glass containers 3 have been set down on the conveyor belt 22. The plug 77 sits on the mouth 20 in FIG. 6 and seals the interior of a glass container 3 against the penetration of foreign bodies, for example the coating powder. For this, the plug 77 has been displaced upwards relative to the further piston 75. If the gripping elements 39 are to grip the glass containers 3 from the release position shown in FIG. 6, then compressed air is introduced into the annular chamber 116, with the result that the piston 47 is driven upwards and consequently the gripping elements 39 are lowered about the axes 40 until the gripping inserts 52 have made sealing and shape-locking contact with the glass container 3.

In FIG. 7 there is shown yet another operational state of the gripping unit 16. Here, the plug 77 is located in its lowermost position caused by the spring 80, without it having come into contact with the mouth of the glass container 3. The glass container 3 in this case however is not coaxial with respect to the longitudinal axis 41. This has led to the result that, upon lowering of the gripping device 12, the right-hand gripping element 39 located in the release position has adversely made contact with the mouth 20. Upon further lowering of the gripping device 12, the base portion 38 with its upper piston part 50 has then been displaced further into the main cylinder 60 against the force of the spring 62. The connection from the aperture 115 into the annular chamber 116 has thereby been broken, so that the pressurized medium is not in a position to close the gripping elements 39 into their gripping position when the gripping elements 39 of the remaining gripping units 16 are closed in order to grip their glass containers 3.

FIG. 8 shows a piece of the respective pipes 98 to 101 which extend over the full length of the associated cross-tie 35. The pipes 98 and 101 are in the manner indicated in FIG.

8 connected to a multi-path valve 120. The pipe 99 is connected to a multi-path valve 121 and the pipe 100 to a multi-path valve 122.

FIGS. 9 to 12 show details of the gripping device 12 to which reference has already been made in part.

FIG. 13 shows another view of the gripping elements 39 located in their gripping position.

FIG. 14 illustrates the circumstances when the gripping elements 39 are located in their release positions. Then, between adjacent gripping elements 39 there are respective gaps 123, each of which is smaller than the diameter of the mouth 20 (FIG. 5). Thus, the mouth 20, during closure of the gripping elements 39 into their gripping positions, cannot escape through the intermediate spaces between the gripping elements 39, but, if the mouth 20 is arranged eccentrically in relation to the longitudinal axis 41, it is centered on the longitudinal axis 41 during the closure of the gripping elements 39.

FIG. 15 shows further details of the bayonet link 66. Within the elongate slot 65 the uppermost operating position of the pin 63 is shown in chain-dotted lines, this being the position which the pin adopts in the particular operational state according to FIG. 7. In this way an operating stroke 124 for the pin 63 is defined, which lies wholly within the elongate slot 65 but which does not however enter into the bayonet link 66. Unintentional release of the base portion 38 from the main cylinder 60 is therefore excluded.

From FIG. 15 it can also be observed that the gripping elements 39 which are closed in their gripping position have on all sides a radial overhang 125 of for example 5 mm in relation to the glass container 3.

The coating 2 on the glass container 3 is shown in FIG. 15 as being of exaggerated thickness. The coating 2 is at least approximately duroplastic and results from a powder which has a constituent of hardenable resin and a hardener constituent. With such a coating, optimum protection is ensured for the virgin external glass surface or for an exterior glass surface provided already with a hot-end coating. This protection is primarily against mechanical damage. With this protection it is possible to reduce the wall thickness of the glass container, without thereby having to accept a reduction in the strength values of the finished packing container.

FIG. 16 shows details of the vessel 18, which, starting from its base 126, comprises in this sequence an air chamber 127, a porous plate 128 and a dispersing device 130 which is moveable in the powder 129. The air chamber 127 is divided into cells 131, 132 in order to achieve uniform through-flow of the powder 129 by compressed air. The powder, together with the compressed air which is fed from the air chamber 127, forms a fluidized sinter bed whose minimum level depth 133 and maximum level depth 134 are shown in FIG. 16 by chain-dotted lines. Ideally, the depth level is maintained at least approximately constant and by control of the drive of the handling unit 13 one can ensure that the gripping units 16 dip into the powder 129 at least approximately to the same depth and as little as possible, independently of the number of glass containers 3 which are gripped by the gripping device 12 in each operational cycle.

Above the dispersing device 130 there is arranged a cullet basket 135 which can be raised from the powder 129. Along an upper edge 136 of each vessel 18 there is arranged a suction channel 137 which is open towards the fluidized bed.

Figure 17:
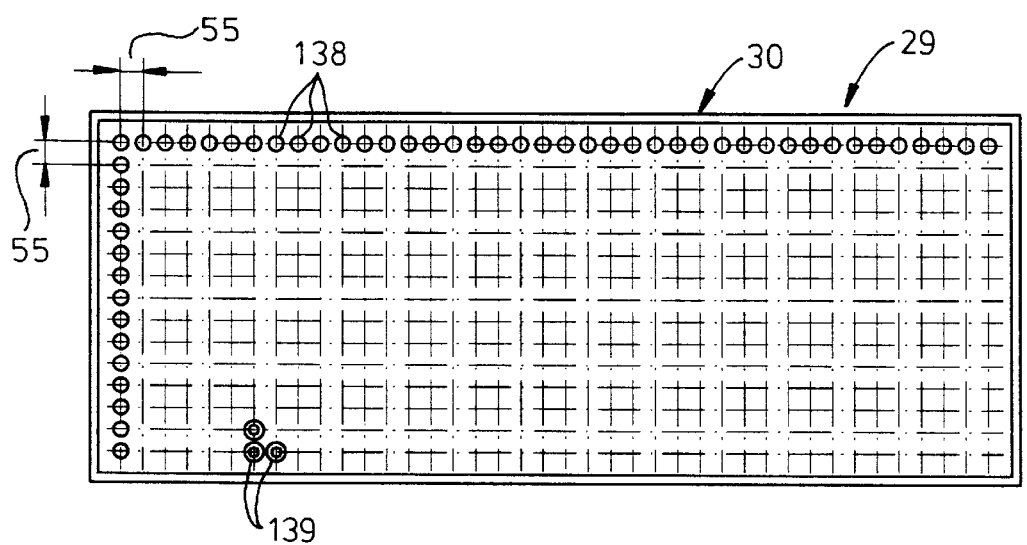
FIG. 17 is a schematic plan view of a heating register for the setting of the coating on the base of the glass containers.

FIG. 17 shows details of two embodiments of heating register 30 according to FIG. 2. With the same raster size 55 as for the gripping device 12 according to FIG. 4, heating devices 138 or 139 are arranged in FIG. 17 below the base 31 (FIG. 16) of each glass container 3. Reference to the heating devices 138 means circular heating plates which are heatable by electrical resistance heating. The heating devices 139 are annular gas burners.

FIG. 18 shows a detail of one possible embodiment of the conveyor belt 22. The conveyor belt 22 consists in this case of wire mesh which comprises comparatively small and numerous support regions 140 which come into contact with the coated bases 31 of the glass containers 3.

Figure 19:
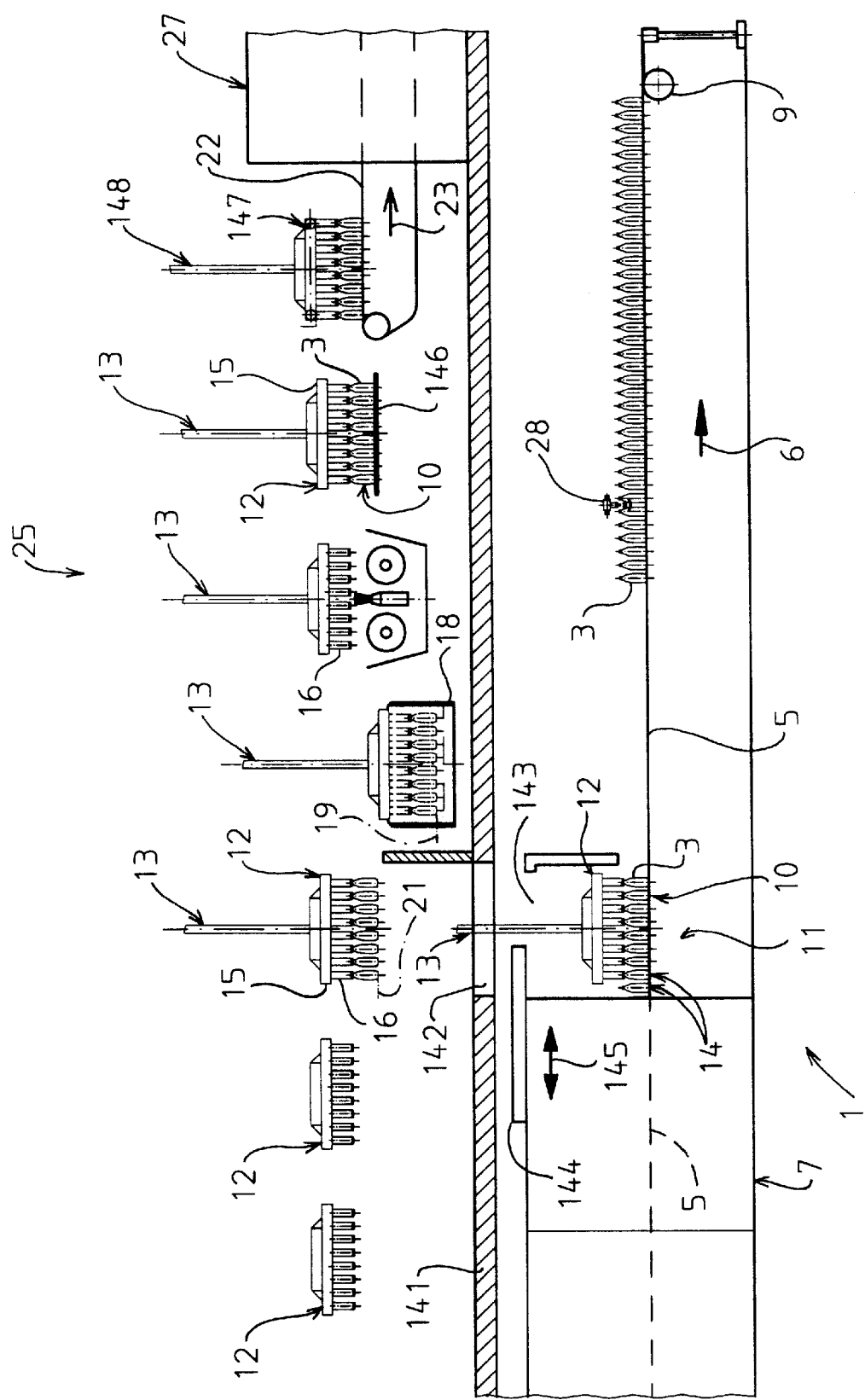
FIG. 19 is a schematic side view of a further embodiment of the coating apparatus.

In the embodiment of the apparatus 1 according to FIG. 19 there is provided at the pick-up site 11 an intermediate platform 141 with an aperture 142 therethrough, through which the handling device 13 with its gripping devices 12 for picking up the groups 10 of the glass containers 3 can be lowered and then raised again with the groups 10. The lehr 7 has a ceiling outlet 143 which is in vertical alignment with the aperture 142. The ceiling outlet 143 can be closed by a cover plate 144 which is as far and as long as possible, in order to save heat energy and in order to maintain the temperature conditions at the pick-up site 11 as constant as possible. The cover plate 144 is, for this purpose, displaceable in the directions of a double-headed arrow 145.

From the pick-up site 11 the handling device 13 with the group 10 is raised vertically up to the third level 21 and then travels in the horizontal direction to the right to a position above the vessel 18 which contains the coating medium. Then, the unit 13, 12 travels downwards until the group 10 dips into the vessel 18 as far as the second level 19. After sufficient deposition of the coating medium onto the glass containers 3, the unit 13, 12 is raised vertically again and then travels in the horizontal direction to a position above a set-down plate 146. This horizontal travel can take place at the third level 21 or at another level. For example, a higher level can be used for this purpose, for travel between the vessel 18 and the set-down plate 146, if as shown in FIG. 19, the comparatively high service station 25 is provided.

Having arrived above the set-down plate 146, the unit 13, 12 with the group 10 is lowered vertically downwards. Then, the gripping units 16 of the gripping device 12 are deactivated, so that they release the glass containers 3 of the group 10 and set them on the set-down plate 146.

The unit 13, 12 which is thus emptied is moved vertically upwards and then, in FIG. 19, is moved to the left above the service station 25. There, the gripping device 12 is cleaned, before the unit 13, 12, preferably at the third level 21, is moved further to the left to a position above the pick-up site 11, where the cycle begins anew.

The group 10 previously deposited on the set-down plate 146 is now gripped by another gripping device 147. This other gripping device 147 is carried by another handling device 148 and can be constructed in an essentially simpler manner than the gripping device 12. This is made possible by the fact that substantially no residual coating medium can adhere to this other gripping device 147. Preferably, this other gripping device 147 is moved in the horizontal direction to above the set-down plate 146, then is lowered in the vertical direction down to the group 10, is moved with the group 10 vertically upwards again and then, as illustrated in FIG. 19, is moved to the right horizontally to a position above the conveyor belt 22. There, this other gripping device 147 is deactivated, so that the group 10 is deposited on the conveyor belt 22. This other gripping device 147 is then moved, preferably vertically upwards and horizontally to the left until it returns again to a position above the set-down plate 146, as soon as a new group 10 has been deposited again there by the unit 13, 12 and the unit 13, 12 has been moved away again. Between the set-down plate 146 and the conveyor belt 22 the unit 148, 147 with the group 10 hanging from it can traverse a base setting zone corresponding to the base setting zone 29 in FIG. 2.

Figure 20:
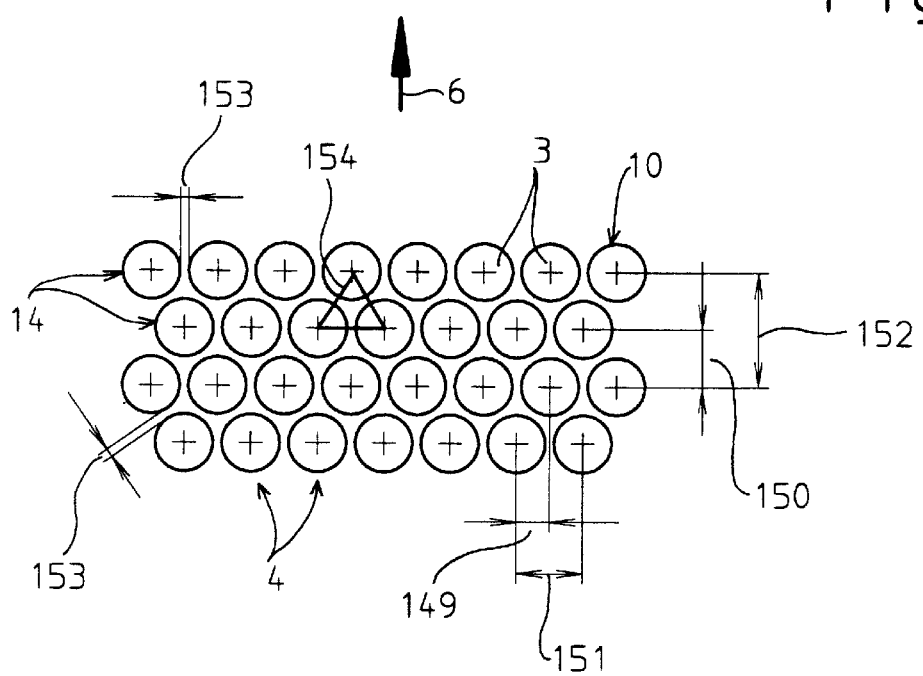
FIG. 20 shows a special positioning pattern for the glass containers.

FIG. 20 shows a special positioning pattern for the glass containers 3 of the group 10. The glass containers 3 are delivered by the lehr belt 5 in this positioning pattern. Adjacent rows 14 and columns 4 are in this positioning pattern each off-set relative to one another by one half spacing 145; 150. The spacings themselves are indicated in FIG. 20 at 151 and 152. Each glass container 3 of the group 10 has a uniform size spacing 153 from all adjacent glass containers 3 of the group 10. For glass containers 3 of circular cross-section this is achieved by the longitudinal axes of each three adjacent glass containers 3 being arranged at the corners of an equilateral triangle 154.

Figure 21:
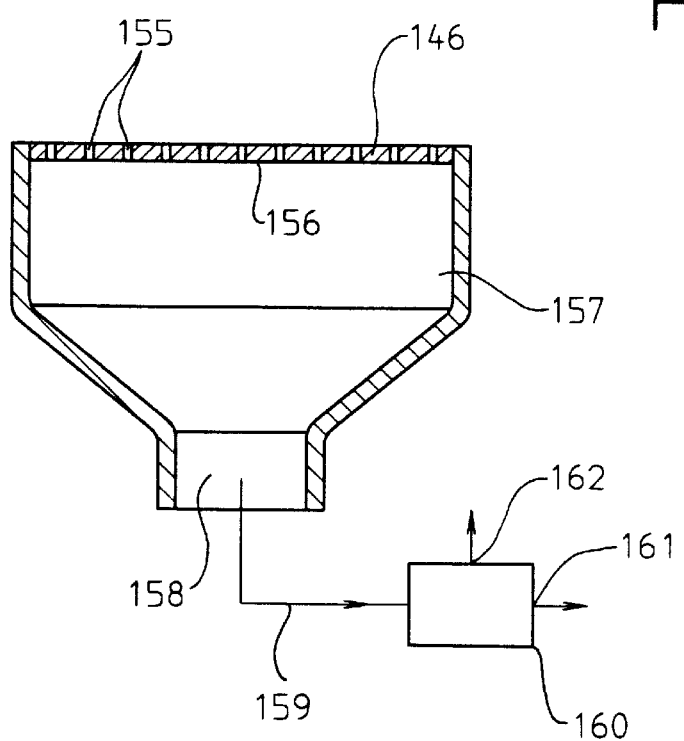
FIG. 21 is a longitudinal sectional view through a set-down plate for a group of the glass containers.

According to FIG. 21, the set-down plate 146 is provided with holes 155 therethrough. An underside 156 of the set-down plate 146 is connected to a chamber 157 in which a reduced pressure can be created. If, upon the deposition of a group 10 of the glass containers 3 on the set-down plate 146, elements of the coating medium should become loose, these are sucked off through the holes 155 and travel through an outlet 158 from the chamber 157, through a pipe 159 and into a settling device 160. From an outlet 161 of the settling device 160 the settled coating medium is then extracted and recycled as much as possible. Cleaned carrier air exits from a further outlet 162 of the settling device 160.

There now follow several examples for the value V=(glass mass of the glass container (3) coated in accordance with the invention): (glass mass of a glass container according to the prior art having the same filling volume and the same filled product but uncoated or provided only with a hot-end coating and a cold-end coating):

0.33 l—Beer bottle with about 5 g $CO_2$/l V=100 g/130 g=0.77

0.5 l—Beer bottle with about 5 g $CO_2$/l V=130 g/180 g=0.72

0.33 l—Lemonade or mineral water bottle with about 8 g $CO_2$/l V=115 g/145 g=0.79

1.0 l—Lemonade or mineral water bottle with about 8 g $CO_2$/l V=290 g/400 g=0.73

0.75 l—Champagne bottle with about 10 to 12 g $CO_2$/l V=450 g/550 g=0.82

Bottles for wine or still water with up to 4 g $CO_2$/l:

0.75 l—Wine bottle V=240 g/330 g=0.73

1.0 l—Wine bottle V=250 g/350 g=0.72

1.0 l—Bottle for still water V=250 g/290 g=0.86

1.5 l—Bottle for still water V=380 g/480 g=0.79

16 US fluid ounces (=474 ml)—Soft drink bottle V=130 g/180 g=0.72

12 US fluid ounces (=355 ml)—Beer bottle for cold filling (without pasteurisation at up to 68° C.) V=120 g/195 g=0.62

500 ml—Soft drink bottle V=130 g/180 g=0.72

12 US fluid ounces (=355 ml)—Soft drink bottle V=115 g/160 g=0.72

13 US fluid ounces (=381 ml)—Beer bottle for cold filling V=130 g/210 g=0.62

What is claimed is:

1. A process for applying a coating to at least a portion of the exterior surface of glass containers, said containers each having an opening providing access to an interior of each container, said process comprising the steps of:
   (a) bringing said glass containers to a temperature suitable for said coating process;
   (b) gripping a group of said glass containers at a pick up site with a gripping device, temporarily sealing said openings in said containers, raising said group of glass containers in a substantially vertical direction to a first level above said pick up site, moving said group of glass containers horizontally to a position above a vessel containing a coating medium, lowering said group of glass containers in a substantially vertical direction into said coating medium to a second level and maintaining said glass containers therein until sufficient said coating medium adheres thereto;
   (c) raising said group of glass containers substantially vertically from said second level to a third level and then moving said group substantially horizontally;
   (d) unsealing said openings in said containers and transferring said group of glass containers onto a conveyor by releasing said containers from said first gripping device;
   (e) moving said group of containers on said conveyor through a setting zone wherein at least a part of said coating medium adhered to said group of containers hardens; and
   (f) returning said first gripping device to grip a second group of glass containers.

2. A process according to claim 1, wherein said group of glass containers is moved in step (c) at said third level to a position directly above said conveyor.

3. A process according to claim 1, further comprising the steps of:
   providing a base setting zone for hardening the coating on the bases of said group of glass containers;
   moving said group of glass containers at said third level to said base setting zone after said step of raising said group of glass containers from said second level;
   hardening the coating medium on each of the bases of said group of glass containers at said base setting zone; and
   moving said group of glass containers at said third level from said base setting zone to said position directly above said conveyor.

4. A process according to claim 3, further comprising the steps of:
   moving said group of glass containers at said third level to above a set down plate prior to said step of hardening said coating medium on said bases, lowering said group of glass containers onto said set down plate, depositing said group of glass containers onto said set down plate by releasing said containers from said first gripping device and then returning said first gripping device in accordance with step (f); and
   gripping said group of glass containers on said set down plate with a second movable gripping device, raising said group of containers back to said third level and moving said group of glass containers substantially horizontally to said base setting zone.

5. A process according to claim 3, wherein step (f) further comprises the steps of moving said first gripping device substantially horizontally at a fourth level into a position above said pick up site and subsequently lowering said first gripping device down substantially vertically to said pick up site.

6. A process according to claim 3, wherein step (f) further comprises the steps of:
   moving said first gripping device at a fourth level to a service station and servicing said first gripping device by performing steps including cooling said first gripping device, cleaning said first gripping device, discharging rejected glass containers from said first gripping device and/or replacing said first gripping device with a replacement first gripping device; and moving said first gripping device at said fourth level substantially horizontally into a position above said pick up site and subsequently lowering said first gripping device substantially vertically to said pick up site.

7. A process according to claim 1, wherein step (f) further comprises the steps of moving said first gripping device substantially horizontally at a fourth level into a position above said pick up site and subsequently lowering said first gripping device down substantially vertically to said pick up site.

8. A process according to claim 7, wherein said fourth level is substantially the same as said first level.

9. A process according to claim 1, wherein step (f) further comprises the steps of:

moving said first gripping device at a fourth level to a service station and servicing said first gripping device by performing steps including cooling said first gripping device, cleaning said first gripping device, discharging rejected glass containers from said first gripping device and/or replacing said first gripping device with a replacement first gripping device; and moving said first gripping device at said fourth level substantially horizontally into a position above said pick up site and subsequently lowering said first gripping device substantially vertically to said pick up site.

10. A process for applying a coating to at least a portion of the exterior surface of glass containers, said process comprising the steps of:

(a) bringing said glass containers to a temperature suitable for said coating process;

(b) gripping a group of said glass containers at a pick up site with a gripping device, raising said group of glass containers in a substantially vertical direction to a first level above said pick up site, moving said group of glass containers horizontally to a position above a vessel containing a coating medium, lowering said group of glass containers in a substantially vertical direction into said coating medium to a second level and maintaining said glass containers therein until sufficient said coating medium adheres thereto;

(c) raising said group of glass containers substantially vertically from said second level to a third level and then moving said group substantially horizontally;

(d) providing a base setting zone for hardening the coating on the bases of said group of glass containers;

(e) moving said group of glass containers at said third level to said base setting zone after said step of raising said group of glass containers from said second level;

(f) hardening the coating medium on each of the bases of said group of glass containers at said base setting zone;

(g) moving said group of glass containers at said third level from said base setting zone to a position directly above a conveyor;

(h) transferring said group of glass containers onto said conveyor by releasing said containers from said first gripping device;

(i) moving said group of containers on said conveyor through a setting zone wherein at least another part of said coating medium adhered to said group of containers hardens; and (j) returning said first gripping device to grip a second group of glass containers.

* * * * *

UNITED STATES PATENT AND TRADEMARK OFFICE
CERTIFICATE OF CORRECTION

PATENT NO. : 6,329,019 B1
DATED : December 11, 2001
INVENTOR(S) : Ulrich Buschmeier et al.

It is certified that error appears in the above-identified patent and that said Letters Patent is hereby corrected as shown below:

Columns 1-18, should be deleted to appear as per attached Columns 1-22.

Signed and Sealed this

Twenty-fifth Day of November, 2003

JAMES E. ROGAN
*Director of the United States Patent and Trademark Office*

PROCESS AND DEVICE FOR COATING GLASS CONTAINERS AND COATED GLASS CONTAINERS

FIELD OF THE INVENTION

The invention relates to a process for the application of a coating to at least a part of the exterior surface of glass containers, an apparatus for the application of a coating to at least a part of the exterior surface of glass containers and a glass container comprising a coating of plastics material extending at least over part of its exterior surface.

BACKGROUND OF THE INVENTION

In one known process for applying a coating to glass containers disclosed in EP 0 442 735 A2 numerous gripping devices are conveyed on a continuously circulating endless conveyor through a coating installation. Each gripping device grips a row of glass containers arranged transversely to the direction of conveyance at a pick-up site, guides the row upwards at an angle, and then downwards at an angle, with the result that the row is dipped into a bath of liquid coating material and subsequently is directed upwards again at an angle to an upper level. At this level the row passes through a bottle base setting zone, and is thereafter guided downwards at an angle and deposited on a conveyor belt. On the conveyor belt the row passes through a setting zone in order to harden the parts of the coating on the glass containers which have not yet been hardened. The emptied gripping devices are conveyed back to the pick-up site on the return run of the endless conveyor. All the devices are fixedly mounted on the endless conveyor and therefore each moves always with the same velocity.

Also, from WO 94/17002 A1 it is known to guide numerous gripping devices on an endless conveyor through the coating installation. Each gripping device picks up from the lehr conveyor a row of glass containers arranged transversely to the direction of transportation. Each row is moved upwards at an angle, then downwards at an angle and dips into a bath of liquid coating material, and then after leaving the bath is guided initially on an upwardly sloping and then downwardly sloping path through a zone for the thermal ageing of the dip overlay, and then—again in sloping upward and downward movements—passes through a setting zone, and finally is again deposited on the lehr conveyor. Each gripping device comprises two gripping bars which respectively engage all the glass containers of the relevant group on opposing sides below the neck. The two gripping bars are opened or closed synchronously by a plurality of drive devices distributed over their length. Each drive device comprises a cylinder mounted on a base portion and part of a piston-cylinder unit whose piston rod carries at the lower free end, and parallel to the gripping bars, a rod which is guided in vertical slots of the base portion. Actuating arms of the gripping bars extend transversely to a longitudinal axis of the gripping bars and are each mounted on the rod to be pivotable upwards and downwards with an elongate hole about an axis of the base portion. Here again all the gripping devices circulate all with the same velocity.

From DE 26 55 411 A1 there is known another type of coating process. Here, a plurality of carriages are drivable independently of one another in a transportation plane on rail segments. Each carriage comprises a plurality of gripping units transversely to a direction of transportation. In a first gap between rail segments a holder picks up an empty carriage and pivots it downwards towards a pick-up site of a tempering device for bottles arranged in rows. There, the gripping units of the carriage grip a row of bottles. The holder is pivoted upwards together with the filled carriage in the first gap. From there, the carriage is caused to travel by way of a rail segment into a lifting mechanism which is waiting in a second gap. The lifting mechanism, together with the carriage, is lowered in the vertical direction until the bottles dip into a fluidized bed of thermoplastic powder. As soon as sufficient powder adheres to the bottles, the lifting mechanism is raised and the carriage with the coated row of bottles is displaced on a rail segment in the second gap. On this rail segment the carriage together with the row of bottles travels successively through a heating chamber, a ventilation chamber and a spray quenching chamber. Thereafter, the row of bottles is deposited at a delivery station by deactivation of the gripping units.

From the German published patent application 2 219 470 another coating process is known per se. Holders for respective individual bottles can be raised and lowered about a horizontal axis at intervals on a chain conveyor. The bottles are pre-heated in a raised position, then are lowered into a fluidized bed of plastics particles, and then are moved again in raised position through a melting oven.

From U.S. Pat. No. 4,022,155 A and German published patent application 2 310 923 it is known per se to swivel glass containers with a parallelogram-type handling device by gripping devices from a first conveyor belt through a coating station and after the coating process onto a second conveyor belt. The coating station comprises a fluidized bed into which the containers are dipped. The fluidized bed contains a thermoplastic polymer.

From U.S. Pat. No. 3,270,710 A it is known per se to coat a glass bottle first with a liquid primer and then with a liquid vinyl resin.

From U.S. Pat. No. 3,200,002 A it is known per se to coat bottles in a dipping process with a liquid plastisol, and for this to move gripping devices continuously with an endless conveyor chain.

From DE 26 17 976 B2 a special bell-shaped gripping unit is known per se. A longitudinally slotted spring sleeve is guided displaceably by means of a piston within a closed outer bell. On each tongue of the spring sleeve there is located at the bottom a gripping claw which is moved radially inwards into positive contact with the glass container by means of an abrasion-resistant ring upon axial relative movement between spring sleeve and bell. A plug which is connected rigidly to the bell is in contact with the top of the mouth or the closure of the glass container. A compression spring biasses the gripping claws into their gripping position. The gripping claws are guided by compressed air into their release position. The compressed air acts on the upper side of the piston of the spring sleeve.

From DE 24 31 952 C2 there is known per se a process for protecting glass bottles from shattering by the application of a plastics coating, in which the glass bottles are coated with a coating powder of softened duroplastic resin by dipping into a fluidized bed or an electrostatic fluidized bed, and the resin deposited to a thickness of at least 50 μm is thermally cured. In this way a coating is created which offers a good resistance to shattering as well as good strength and resistance to alkalis as well as having small frictional resistance, so that one thereby has a smooth transparent exterior surface as well as a product which is economical to manufacture.

The solution known from DE 25 10 734 B2 concerns a process for the coating of glass bottles with a transparent, duroplastic protective layer by the application of powdered lacquer in a fluidized bed or in an electrostatic fluidized bed. Primarily, one is talking here about pure glass bottles with an aqueous or alcoholic silane finish, dried and heated. The applied protective layer is very elastic, has excellent adhesion and resistance to alkalis and ensures a longer period of utilization for use as a multiple-use bottle.

From DE 27 48 696 A1 there is known a process for the coating of hollow glass bodies, in which a duroplastic powder varnish is used which is applied in a fluidized bed.

SUMMARY AND OBJECTS OF THE INVENTION

It is the object of the invention to improve the coating of the glass containers and to improve the coated glass containers themselves.

This object is achieved, in respect of the process, by (a) bringing the glass containers to a temperature suitable for the coating process;

(b) gripping a group of the glass containers at a pick up site with a gripping device, temporarily sealing the openings in the containers, raising the group of glass containers in a substantially vertical direction to a first level above the pick up site, moving the group of glass containers horizontally to a position above a vessel containing a coating medium, lowering the group of glass containers in a substantially vertical direction into the coating medium to a second level and maintaining the glass containers therein until sufficient the coating medium adheres thereto;

(c) raising the group of glass containers substantially vertically from the second level to a third level and then moving the group substantially horizontally;

(d) unsealing the openings in the containers and transferring the group of glass containers onto a conveyor by releasing the containers from the first gripping device;

(e) moving the group of containers on the conveyor through a setting zone wherein at least a part of the coating medium adhered to the group of containers hardens; and (f) returning the first gripping device to grip a second group of glass containers.

By this means the handling device can be simplified and a trouble-free transportation of the glass containers is facilitated. Preferably, each group of glass containers is taken from the lehr conveyor of a lehr furnace which follows a glass forming machine. This permits the inherent thermal energy of the glass containers at the end of the lehr furnace to be utilized to the optimum, so that the coating medium is applied to the optimally tempered glass containers and subsequently hardens to a resistant protective layer. Preferably, the group is entrained in the direction of transportation of the lehr conveyor during the pick-up from the continually circulating lehr conveyor, and then is transferred to the vertical direction of movement. In this way the glass containers can be picked up smoothly and swiftly. The gripping devices are uncoupled from one another and can be moved on each section of the path with optimum velocity profile. This contributes well to the quality of the coating and consequently to the quality of the glass containers. The dipping time of the glass containers in the coating medium which is important for a uniform and—to save coating medium as thin as possible formation of the layer can be maintained very accurately.

Through the steps of moving the group of glass containers at the third level to above a set-down plate prior to the step of hardening the coating medium on the bases, lowering the group of glass containers onto the set-down plate, depositing the group of glass containers onto the set-down plate by releasing the containers from the first gripping device and then returning the first gripping device in accordance with step (f), subsequently gripping the group of glass containers on the set-down plate with a second movable gripping device, raising the group of containers back to the third level and moving the group of glass containers substantially horizontally to the base setting zone the carry-over of residual coating medium beyond the set-down plate can be substantially reduced or eliminated.

By moving the group of glass containers in step (c) at the third level to a position directly above the conveyor one has a particularly rapid and cost-effective manner of operation.

If the layer is to be set first on the bottom of the glass containers, before the glass containers are deposited on the conveyor belt it is recommended to provide a base setting zone for hardening the coating on the bases of the group of glass containers. The group of glass containers at the third level may then be moved to the base setting zone after the step of raising the group of glass containers from the second level and the coating medium on each of the bases of the group of glass containers at said base setting zone may then be hardened. The group of glass containers at the third level is then moved from the base setting zone to the position directly above the conveyor.

An overall favorable motion characteristic for the glass containers is achieved by including in step (f) the steps of moving the first gripping device substantially horizontally at a fourth level into a position above the pick up site and subsequently lowering the first gripping device down substantially vertically to the pick up site.

A service station may be visited by the gripping device either in each operating cycle or only as needed. Preferably this is accomplished as part of step (f) by including the steps of moving the first gripping device at a fourth level to a service station and servicing the first gripping device by performing steps including cooling the first gripping device, cleaning the first gripping device, discharging rejected glass containers from the first gripping device and/or replacing the first gripping device with a replacement first gripping device, and then moving the first gripping device at the fourth level substantially horizontally into a position above the pick up site and subsequently lowering the first gripping device substantially vertically to the pick up site.

By making the fourth level the same as the first level a structural and operational simplification is achieved.

A rapid exchange of the containers is possible even within the normal operating cycle if, when the vessel holding the coating medium is in need of service, it is moved out from its operational position transversely to the direction of transportation of the glass containers and is replaced by an operationally ready reserve vessel.

Preferably other gripping devices are moved in a separate closed path as part of step (d), wherein the other gripping devices are emptied of glass containers and then conveyed back to the set-down plate in order to pick up another group of the glass containers.

Preferably, a bottom hardening takes place with the glass containers stationary. A heating by thermal radiation can be effected not only from below, but at any suitable angular orientation of a heating arrangement relative to the bottom of the containers.

Following the base setting zone the glass containers are cooled and can be sprayed with a friction-reducing liquid solution in a cold-end coating process known per se.

By lowering the glass containers into a fluidized sinter bed containing a powder as a coating medium in step (b) one has a uniform and easily controllable coating process. Alternatively, the powder could be applied to the glass containers by an electrostatic coating process known per se.

Preferably the powder comprises hardenable resins and a hardener component, and is hardened at least to an approximately duroplastic coating on the glass containers resulting in a particularly favorable coating of the glass containers. Glass containers made in this way are suitable to take filling products under increased internal pressure, for example drinks containing carbon dioxide. Preferably powder having a grain size of 5 to 60 μm is used.

A particularly smooth exterior surface of the coating is achieved by including a dispersion coating medium in the vessel into which the glass containers are lowered in step (b) and by using acrylic resins in the dispersion as a dispersed phase, the resins being hardened to an acrylic resin lacquer coating on the glass containers.

The aforementioned object of the invention is achieved by an apparatus including a temperature adjusting device for bringing a group of the glass containers to a temperature suitable for the coating process; a pick up site and a path extending from the pick up site; a handling device which includes the first movable gripping device capable of gripping the group of glass containers at the pick up site and moving them therefrom and returning to the pick up site after releasing the group of glass containers, the first gripping device having a carrier movable along the path and a plurality of gripping units arranged on the carrier, there being one gripping unit for each of the glass containers of the group, each gripping unit comprising a base portion, a longitudinal axis, and at least three gripping elements movably mounted thereon and moveable between a gripping position gripping one of the glass containers and a release position releasing the one glass container, each of the gripping elements comprising an actuating arm extending toward the longitudinal axis of the gripping unit, each the gripping unit further comprising a piston-cylinder unit for actuating the gripping elements between the gripping and releasing positions; a vessel disposed along the path for containing a coating medium, the vessel positioned to receive the group of glass containers, the handling device capable of dipping the group of containers into the coating medium and raising the group of containers therefrom and moving the group of containers onward; a setting zone for hardening at least a part of the coating medium coating the glass containers, the setting zone disposed along the path; and a conveyor traversing the setting zone for receiving the group of glass containers released from the gripping device and conveying the glass containers through the setting zone. As tempering device one can use for example the lehr oven which follows a glass molding machine. Before the pick-up by the gripping device, the glass containers can be completely uncoated or be provided just with a hot-end coating known per se. In particular, the carrier can be made substantially rectangular. The group is then for example a rectangular matrix of 15 rows and 40 columns, thus a total of 600 glass containers, with all the glass containers being arranged spaced from one another. The group can be simply and reliably set down on the conveyor belt after the coating process. The setting of the coating on the conveyor belt is effected particularly uniformly and is easily controllable. As necessary, the base setting zone for the base coating of the glass containers is provided if it appears necessary to carry out such base setting in advance before the glass containers are deposited on the conveyor belt. Each gripping unit is preferably provided with four gripping elements. This gives the possibility, with an arrangement of the gripping units in, a predetermined matrix, of moving the gripping elements with minimum spacing of the gripping units from one another into suitable intermediate spaces between the gripping units. The piston-cylinder unit is preferably double-acting and is actuated pneumatically. Instead of an upward and downward pivoting of the gripping elements, these could alternatively be actuated in such a manner that they are moved linearly in relation to the rest of the gripping unit.

To ensure that substantially no coating medium adheres to the first gripping device, which medium could otherwise harden in particular in a base setting zone and contaminate the gripping device and adversely affect its function, the apparatus includes a set-down plate disposed to receive the group of glass containers deposited thereon from the first gripping device and a second handling device having a second gripping device movable along the path through the base setting zone for gripping and moving the group of glass containers from the set-down plate through the base setting zone to the conveyor, the second gripping device being movable back to the set-down plate for gripping a further group of glass containers after depositing the group of glass containers on the conveyor.

The coating medium is prevented from getting into the interior space of the gripping elements in the gripping position because each gripping element comprises a segmental form and sealingly cooperates in the gripping position with the other gripping elements of the gripping unit and with the glass container gripped by the gripping elements to sealingly cover a gripped portion of the gripped glass container.

The gripping elements can be particularly easily moved and in a functionally reliable way because the piston cylinder unit preferably comprises a main cylinder arranged concentrically within the base portion. The main cylinder has a bore arranged coaxially with a piston arranged concentrically and displaceably within the cylinder. A piston rod extends from the piston concentrically through the bore. Actuating arms are coupled to the piston rod.

A spring, arranged between the piston and the base portion for biasing the gripping elements into a gripping position ensures that, in the absence of pressurized medium, the gripping elements are closed into their gripping position.

By using a main cylinder securable to the carrier and forming a cylinder chamber, the cylinder having a base portion comprising an upper piston portion displaceably and sealingly guided in the main cylinder, it is possible to balance the gripping unit for the case where the mouth of a glass container is arranged eccentrically to an otherwise impermissible degree and thereby ensure that an opened gripping element strikes against the mouth of the container upon lowering of the gripping unit.

A biasing spring, arranged between the upper piston portion and the main cylinder biases the upper piston portion into a lowermost position, thereby ensuring that the gripping unit is continuously biased into the normal operating position.

The carrier includes an elongated longitudinal slot adjacent to the base portion. The base portion includes a pin extending therefrom and engaging the slot. The pin and slot thereby secure the base portion against rotational motion relative to said carrier thereby providing a particularly simple safety against rotation.

The elongated slot forms part of a bayonet link allowing the gripping unit to be exchanged rapidly, as necessary.

Preferably the piston rod has a concentric aperture through which extends a second piston rod having a free upper end securable to the base portion of the cylinder. The lower end of the second piston rod carries a second piston positioned at the level of the gripping elements. An additional cylinder is displacably guided on the second piston and piston rod. The additional cylinder carries a stop at the bottom which cooperates sealingly, either with a mouth of a glass container or with the gripping element when they are located in their gripping position. These features fulfil a double function. On the one hand, in normal operation the mouth of the glass container is sealed off by the plug, and thus an undesirable penetration of coating medium into the glass container is prevented, and on the other hand the plug seals off the lower gripping aperture of the gripping elements when located in the gripping position if no glass container should be located below this gripping unit on any occasion. Thus, again, in the latter case, coating medium is prevented from getting into the interior of the gripping unit.

Between the additional cylinder and the second piston rod a spring is arranged which biases the plug into a lowermost position to ensure that the plug can fulfil its function even in the absence of the relevant pressurized medium.

The pressurized medium is preferably compressed air at, for example 3 bar, which is conducted through a hollow chamber extending in the second piston rod in order to raise the additional cylinder.

Air at a pressure of, for example, 4900 Pa (500 mm water head) is used as flushing gas. The flushing gas is introduced into the cylinder chamber and conducted through channels in the upper piston portion into a concentric through aperture of the piston rod and from there into an internal chamber of the gripping elements. The flushing gas on the one hand cools the gripping unit and prevents or reduces in this way the tendency of coating medium to stick to the gripping unit. Additionally, by means of the flushing gas, an excess pressure is created in the interior space of the gripping unit, with the result that the penetration of coating medium into the gripping unit is made more difficult or is prevented.

Preferably the supply of pressurized medium is effected by a common supply device which permits structural and operational simplification. Each supply device comprises a plurality of pipes separate from one another, one of the pipes being connected permanently connected to the cylinder chamber and each one of the remaining pipes being connected to an associated aperture in a side wall of the main cylinder. In terms of the number of gripping units one is talking here preferably about several gripping units of a column in the predetermined matrix. Such a column comprises for example 15 gripping units arranged spaced from one another.

Each supply device is sealingly connectable with an end wall of the associated plurality of gripping units and each pipe is connected by means of a connecting bore of the supply device permanently to a terminal channel of the main cylinder, each terminal channel issuing into an associated aperture.

Because the gripping elements project in their gripping position in the radial direction on all sides with an overhang beyond the associated container, coating medium possibly falling from the gripping elements is prevented from falling onto the glass containers suspended by the gripping elements, which could otherwise lead to a non-uniform coating.

By arranging each group of the glass containers to be dipped simultaneously into at least one vessel containing the coating medium, and having each vessel containing a fluidized sinter bed comprising a powder as a coating medium one achieves a particularly uniform and economical coating. More than one vessel can be used if the operational circumstances require this.

Preferably each vessel, starting at its base, comprises, in sequence, an air chamber, a porous plate and a dispersing device movable in the powder. This ensures a reliable coating operation. The air chamber is preferably divided into cells in order to ensure that the air supply over the cross sectional surface area of the fluidized bed is as uniform as possible. The porous plate is of such porosity that the air is able to travel upwards from below, but that powder particles cannot pass through the plate. The porous plate is made for example as a bronze or plastics sintered plate.

A cullet basket, arranged above the dispersing device and which can be raised from the powder, ensures that glass containers or cullet which has fallen into the fluidized bed can be removed easily again from the fluidized bed.

By arranging a suction channel open towards the fluidized bed along the upper edge of each vessel ensures that the surroundings of the vessel can be maintained free from the residual powder in an effective way.

By arranging each group of the glass containers to be dipped simultaneously into at least one vessel containing a dispersion as coating medium constructional simplifications in comparison to using powder as coating medium is achieved.

To obtain certain operational advantages a sensor device is provided by means of which one may ascertain whether and how many gripping units of the gripping device have gripped no glass container. The drive means of the handling device is controllable dependent upon the number of glass containers which are not gripped so that the gripping units always dip into the coating medium to at least the same depth. The dipping depth of the gripping units should be kept as small as possible, so that as little coating medium as possible sticks to the gripping units and can pass into the glass containers and the surroundings.

The drive means of the handling device is controllable so that the speeds at which the glass containers are dipped into the coating medium and raised from the coating medium are modulated such that there results a particularly rapid and reliable coating. For example, the velocity can be kept constant on the one hand when dipping the glass containers, shortly before the contact of the surface of the coating medium by the base of the glass containers, and on the other hand when raising the glass containers shortly before the bases of the containers rise again from the surface. In particular, this should prevent coating medium from being excessively agitated and distributed in an uncontrolled manner into the surroundings by the dipping and raising movements of the glass containers and of the gripping units.

By providing the set-down plate with apertures therethrough and connecting an underside of the set-down plate to a chamber in which a reduced pressure can be created residues of the coating medium can be collected and possibly returned to the process.

Preferably the base setting zone includes a heating register having a heating device facing the base of each glass container. The heating device can be for example an electrical resistance heater with a circular heating plate or it can be formed as an annular gas burner.

So that heat energy is spared, and an undesirable heating of the relevant gripping units can be reduced those heating devices which are arranged opposite places where glass containers are absent are arranged to be rendered inactive.

If the base coating has not set before the glass containers are set down on the conveyor belt then it is preferred that the conveyor belt has comparatively small and numerous support zones which come into contact with the coated bases of the glass containers. The conveyor belt can be made for example similar to a wire mesh.

By providing a separating means to at least the support zones of the conveyor belt before the bases are set down on the support zones sticking of the bases of the glass containers to the conveyor belt can be prevented or greatly reduced. The separating means can for example be sprayed on to the conveyor belt as a liquid.

Better utilization of space and protection against uncontrollable tipping over of glass containers is achieved if, in each group of the glass containers leaving the temperature device, the glass containers are arranged in a direction of conveyance in columns and transversely to the direction of conveyance in rows wherein the adjacent columns and rows each are offset relative to one another, preferably by a half spacing. Preferably, each glass container of each group has the same size spacing form all adjacent glass containers of the group.

The aforementioned object of the invention is achieved in respect of the glass container itself by a glass container comprising a coating of plastics material extending at least over part of its exterior surface, the coating being produced by the process and apparatus as described above, and wherein the ratio V, which equals the ratio of the glass mass of a glass container coated according to the invention to the glass mass of a glass container according to the prior art having the same filling volume and the same filled product but uncoated or provided only with a hot-end coating and a cold end coating is between 0.62 to 0.86. By these means it is possible significantly to reduce the glass mass and consequently the wall thickness of the glass containers as compared with the prior art. Any such reduction leads to considerable economical advantages. The thickness of the coating can be 30 to 60 µm.

Preferably the coating comprises duroplastic powder lacquer, wherein the powder lacquer coating can, as required, be glossy, transparent, smooth, glass-clear, colored, or be formed in some other way. The duroplastic powder lacquer layer represents excellent protection against damage to the exterior surface of the glass. Thus, it is possible to preserve the strength of the glass during use of the glass containers.

Substantially the same advantages and, in addition, a particularly smooth exterior surface of the coating results if the coating is an acrylic resin lacquer obtained from a dispersion.

The possible savings in glass mass which can be achieved with examples of glass containers available on the market range between a V of 0.62 to a V of 0.86.

These and other features and advantages of the invention will now be described in more detail with reference to embodiments which are given by way of example and which are shown in the drawings.

BRIEF DESCRIPTION OF THE DRAWINGS

FIG. 1 is a schematic side view of a first embodiment of the coating apparatus,

FIG. 2 is a schematic side view of another embodiment of the coating apparatus,

FIG. 3 is the plan view of the apparatus shown in FIG. 2,

FIG. 4 is the view taken along the line IV—IV in FIG. 1 on an enlarged scale,

FIGS. 5, 6 and 7 are longitudinal sectional views through a gripping unit of the apparatus in respective different operational situations, FIG. 8 is the view taken along the line VIII—VIII in FIG. 5, FIG. 9 is the view taken along the line IX—IX in FIG. 5, FIG. 10 is the sectional view taken along the line X—X in FIG. 5, FIG. 11 is the sectional view taken along the line XI—XI in FIG. 7, FIG. 12 is the sectional view taken along the line XII—XII in FIG. 8, FIG. 13 is the sectional view taken along the line XIII—XIII on a reduced scale, FIG. 14 is the view taken along the line XIV—XIV in FIG. 6, FIG. 15 is the sectional view taken along the line XV—XV in FIG. 5, FIG. 16 is a longitudinal sectional view through an edge region of a fluidized bed, FIG. 17 is a schematic plan view of a heating register for the setting of the coating on the base of the glass containers, FIG. 18 is the plan view of a part of a conveyor belt carrying one of the coated glass containers, FIG. 19 is a schematic side view of a further embodiment of the coating apparatus, FIG. 20 shows a special positioning pattern for the glass containers, and FIG. 21 is a longitudinal sectional view through a set-down plate for a group of the glass containers.

DETAILED DESCRIPTION OF THE PREFERRED EMBODIMENT

FIG. 1 shows an apparatus 1 for the application of a coating 2 (FIG. 15) to a part of the exterior surface of glass containers 3. The glass containers 3 are manufactured in a glass forming machine which is not shown and are pushed onto a lehr belt 5, for example in 40 parallel columns 4 (FIG. 4). An upper run of the endless lehr belt 5 moves continuously in a direction of transportation 6. The lehr belt 5 travels first through a lehr 7 up to an exit end 8 of the lehr 7 and then travels to a reversing point 9, from which it is guided back to the entry end of the lehr 7.

In talking here about glass containers 3, reference is particularly made to bottles which are provided before their entry into the lehr 7 with a so-called hot-end coating. By this is meant the application of a tin oxide layer or tin dioxide layer which is applied in the gaseous phase to the glass containers 3. This is effected generally by the so-called CVD (chemical vapor deposition) process. The hot-end coating has inorganic properties. On this oxidized surface layer the subsequently applied coating, applied in accordance with the invention, sticks just as well as to the likewise oxidized bare glass surface which would be provided without previous hot-end coating. In accordance with the invention, both glass containers 3 with hot-end coating and also glass containers 3 without hot-end coating can be coated with the same results.

The lehr 7 constitutes a tempering device at whose exit end 8 the glass containers 3 all have the same temperature as far as possible, in the range of 100 to 160° C.

Immediately following the exit end 8 of the lehr 7, a group 10 of the glass containers 3 is gripped at a pick-up site 11 by a gripping device 12 of a handling device 13. During this gripping process the lehr belt 5 continues to travel in the direction of transportation 6. Because of this, the handling device 13 during the pick-up of the group 10 from the lehr belt 5 receives a superimposed movement in the direction of transportation 6 in a manner not shown and also upwards. Thus, the group 10 can be picked up without the glass containers 3 which are following on on the lehr belt 5 thereby being adversely affected.

In the illustrated embodiment, the group 10 consists of a matrix of 40 columns 4 (FIG. 4) and 15 rows 14, thus making a total of 600 glass containers 3. The gripping device 12 comprises a carrier 15 which is movable along a path of the handling device 13 which is not shown in detail. On the carrier, for each glass container 3 of the group 10, there is arranged a gripping unit 16 whose individual parts will be described later in connection with FIGS. 5 to 15.

From the pick-up site 11 the group 10 is raised by the handling device 13 in a substantially vertical direction to a first level 17, then is transported horizontally as shown in FIG. 1 to the left over a vessel 18, and finally is lowered in the vertical direction into the vessel 18 to a second level 19. The vessel 18 contains a powder as coating medium for the glass containers 3 and, with this powder, constitutes a fluidized sintering bed.

Normally, the gripping units 16 grip around a mouth 20 (FIG. 5) of the associated glass containers 3 and prevent the mouth 20 from being coated with the powder. In order to ensure a complete coating of the rest of the glass containers 3, not only the glass containers 3 but also a lower region of the gripping units 16, to a maximum depth for example of 20 mm, is dipped into the powder in the vessel 18. The dipping time amounts for example to >0 second to <5 seconds, until sufficient powder has stuck to the heated exterior surface of the glass containers 3. The group 10 is then raised by the handling device 13 from the second level 19 to a third level 21 and then is transported in the horizontal direction, to the right in FIG. 1, by means of a conveyor belt 22. Preferably, the third level 21 is made the same as the first level 17.

An upper run of the conveyor belt 22 runs preferably continuously in a transportation direction 23 which is usually parallel to the transportation direction 6 of the lehr belt 5. Preferably, the handling device 13, in this delivery position above the conveyor belt 22, moves not only in the vertical direction but also in a superimposed manner in the transportation direction 23, while the gripping device 12 is deactivated and the group 10 is transferred to the conveyor belt 22. In this way, the glass containers 3 are delivered in a stable manner to the conveyor belt 22. At this delivery position, a suction device (not shown) can be provided for surplus adhering coating medium. Before accepting the glass containers 3, the conveyor belt 22 can be provided in a manner not shown with a separating means which reduces or prevents sticking of the bases 31 of the containers (FIG. 16).

The gripping device 12 emptied of the glass containers 3 is carried back at a fourth level 24 in the horizontal direction, to the left in FIG. 1, to a position above the pick-up site 11, and then is lowered again in the vertical direction to the pick-up site 11 in order to receive a new group 10.

Alternatively, the emptied gripping device 12 can be conveyed back at a fourth level 24 in the horizontal direction beyond the pick-up site 11 out to a service station 25. In the service station 25 maintenance, as necessary, can be carried out, such as the cooling of the gripping device 12, the cleaning of the gripping device 12 of adhering coating medium or the release of rejected containers 26. In the service station 25 the gripping device utilized up to that point can also be replaced by a new gripping device 12. Two such new gripping devices 12 are shown in FIG. 1 to the left of the service station 25 in a stand-by position.

The coated glass containers 3, received by the gripping device 12, are conveyed by the conveyor belt 22 in the transportation direction 23 into a setting zone 27 which is formed as a tunnel-like setting oven. In the setting zone 27 the powder layer on the glass containers 3 is hardened, for example for 10 minutes at about 180 to 220° C. After this, the glass containers can be cooled to about 80° C. and then be provided with a cold-end coating known per se.

The apparatus 1 according to FIG. 1 also offers the alternative possibility of not coating the glass containers, if desired or in the case of faults in the powder coating installation, with powdered lacquer. In this case, the gripping device 12 remains inactive at the pick-up site 11, so that the glass containers 3, as is indicated in FIG. 1 at the right-hand bottom corner, travel further on the lehr belt and there are provided with a conventional cold-end coating by a coating device 28 known per se.

The fourth level 24 can be made the same as the first level 17.

In all the Figures of the drawings the same or corresponding parts are shown with the same respective reference numbers.

In the embodiment of the apparatus 1 shown in FIG. 2 the group 10 of the glass containers 3 is raised in the same way at the pick-up site 11 from the lehr belt 5 by the handling device 13 as according to FIG. 1. From the first level 17 the group 10 is then instead not moved to the left in FIG. 2 but to the right in the horizontal direction until it is positioned above the vessel 18. Then, the group 10 is dipped in the same way into the vessel 18 and is again raised from the vessel as in FIG. 1. After being lifted from the coating medium in the vessel 18, the group 10 is conveyed in the horizontal direction to the right in FIG. 2 into a base setting zone 29. In the first base setting zone 29 a heating register 30 is arranged in a stationary position below the group 10. By means of the heating register 30 substantially only the layer 2 (FIG. 15) on the bases 31 (FIG. 16) of the glass containers 3 is hardened. This hardening lasts for example for a maximum of 40 seconds and preferably takes place at the first level 17 (FIG. 1).

Following the base hardening in the first base setting zone 29, the group 10 is conveyed by the handling device 13 in the horizontal direction to the right in FIG. 2 by means of the conveyor belt 22. The group 10 is deposited in the same way on to the conveyor belt 22 as has been described in relation to FIG. 1. There then follows the hardening of the rest of the layer 2 (FIG. 15) in the setting zone 27 which again is formed as a tunnel-like setting oven. Beyond an exit end 32 of the setting zone 27 the coated glass containers 23 cool off and are subsequently provided by the coating device 28 with a cold-end coating known per se.

Such a cold-end coating can be carried out on the glass containers 3 following the pick-up site 11, in a manner analogous to that of FIG. 1, if the containers travel further on the lehr belt 5 without powdered lacquer coating.

FIG. 3 shows a plan view of the apparatus 1 of FIG. 2 in a schematic representation. When the vessel 18 has to be exchanged for repair or maintenance purposes, it is moved out sideways from its operating position in the direction of the arrow 33. A fresh, ready-prepared vessel 18 is then brought into the operating position from the opposite side in the direction of the arrow 34. Thus, the exchange of the vessel 18 can be carried out with the minimum loss of time.

FIG. 4 shows the view of the gripping device 12 from below. It will be appreciated that in this case 600 gripping units 16 are arranged on the carrier 15 in matrix array in columns 4 and rows 14. Tubular cross-ties 35, of which only one is shown in FIG. 4, are components of the carrier 15. Each one of these cross-ties 35 is associated with a column 4 of in this case 15 gripping units 16, and carries these gripping units 16. In the embodiment according to FIG. 4, the carrier 15 has a division 36 at its longitudinal center. The division 36 serves to separate the two halves of the gripping device 12 thereby created, in the direction of the double arrow 37, before each half of the gripping device 12 is lowered into, in this case, its own separate vessel (not shown) with coating medium. These two vessels are set with their end walls in contact with each other or have a common end wall, so that the two halves of the gripping device 12 only need to be moved apart sufficiently for the separating wall between the two vessels to be passed by the two halves. After the lifting of the two halves of the gripping device 12 from the fluidized beds the halves of the gripping device 12 are brought together again, so that they contact each other at the division 36 and are locked together for the onward movement. The carrier 15 can in similar manner have more than one such division 36. The number of vessels 18 would then increase correspondingly.

FIG. 5 shows details of the gripping device 12 and in particular one of the gripping units 16 which is formed in the same way.

Each gripping unit 16 comprises a base portion 38 on which in this case four gripping elements 39 are mounted to be raised and lowered each about an axis 40. Each gripping element 39 is provided with an actuating arm 42 which extends towards the longitudinal axis 41 of the gripping unit 16. Each actuating arm 42 has at its free end a ball head 43 which engages in a radially outwardly opening groove of an actuating ring 44. The actuating ring 44 is fixed by a nut 45 to a piston rod 46 of a piston 47 of a piston-cylinder unit 48. The piston 47 slides in a cylinder 49 which is formed in an upper piston part 50 of the base portion 38. Alternatively, the gripping elements can be movable linearly between their gripping and release positions in a manner not shown.

Each gripping element 39 is formed in the manner of a segment and cooperates sealingly in a gripping position shown in FIG. 5 with the other gripping elements 39 along joints 51 and the associated glass containers 3. At the lower end each gripping element 39 carries a gripping insert 52 which is screwed into place and which, in the gripping position shown in FIG. 5, lies below and against a safety ring 53 of the mouth 20 in a shape-locking and sealing manner. Above the circumferential safety ring 53 each mouth 20 is provided in the usual way with an external thread 54 for the fitting of a closure cap which is not shown. The gripping inserts 52 lie in sealing contact with one another in the plane of the joints 51 and also in the circumferential direction, when the gripping elements 39 are located in the gripping position shown in FIG. 5.

The arrangement of three and more gripping elements 39 per gripping unit 16 has a special advantage. If the mouth 20 of the associated glass container 3 is not arranged concentrically with respect to the longitudinal axis 41 of the gripping unit 16, before the mouth 20 is gripped by the gripping elements, a centring of the mouth 20 onto the longitudinal axis 41 can be effected by the gripping elements 39 within predetermined tolerances. The special advantage is that this can be carried out with three and more gripping elements 39 for eccentricities of the mouth 20 which occur in any radial direction. Such eccentricities can have several causes. For one, the normally straight glass container 3 can have its base 31 (FIG. 16) eccentrically positioned. For another, a glass container 3 which has its base exactly positioned can be skewed, so that its mouth 20 deviates from the ideal concentric position. In order to make allowance for such circumstances the matrix according to FIG. 4 has a sufficiently large raster size 55 of for example 128 mm in both coordinates.

In FIG. 5 the piston rod 46 is guided in the radial direction in a bore 56 of the base portion 38 through a guide sleeve 57. Between the base portion 38 and the piston 47 there is arranged a spring 58 which biasses the gripping elements 39 into their gripping position.

The upper piston part 50 is displaceable in a main cylinder 60 with the creation of a cylinder chamber 59 and is guided in sealing manner by seals 61. Between the upper piston part 50 and the main cylinder 60 there is arranged a spring 62 biassing the upper piston part 50 into a lowermost position, shown in FIG. 5. This lowermost position is defined by a pin 63 of the base portion 38, with the lower end 64 of the pin engaging in a longitudinal slot 65. The longitudinal slot 65 is a component of a bayonet link 66 (see also FIG. 15) for the pin 63, permitting a rapid assembly and dismantling of the gripping unit 16. The bayonet link 66 is formed in a side wall 67 of a cup 68 which is screwed on to a lower extension 69 of the cross-tie 35.

The piston rod 46 has a concentric aperture 70 therethrough, through which a further piston rod 71 extends. A free, upper end 72 of the further piston rod 71 can be fixed by a nut 73 to the upper piston part 50 of the base portion 38. A lower end 74 of the further piston rod 71 carries a further piston 75 at the level of the gripping elements 39. A further cylinder 76 is guided displaceably on the further piston 75 and the further piston rod 71 and at the bottom carries a plug 77. The plug 77 cooperates either with the mouth 20 of the glass container 3 in the manner which can be seen from FIG. 5, or else the stop 77 is seated sealingly in the central, aperture 78 of the gripping inserts 52 when the gripping elements 39 are located in their gripping position shown in FIG. 5 but with no glass container 3 being gripped. It can happen that in the matrix of a group 10 of the glass containers 3, glass containers 3 will be missing here and there. In this case the plug 77 ensures that coating medium does not pass into an internal chamber 79 of the associated gripping elements 39.

Between the further cylinder 76 and the further piston rod 71 there is arranged a spring 80 which biasses the plug 77 into a lowermost position as indicated in FIG. 7. The further piston rod 71 has a hollow chamber 81 through which compressed air can be introduced to an upper side 82 of the further piston 75 in order to lift the further cylinder 76. This compressed air comes through a connecting passage 83 from an annular chamber 84 of the upper piston part 50. The annular chamber 84 is in permanent communication with an axially parallel connecting passage 87 (FIGS. 10 and 11) in the side wall 86 by way of an aperture 85 in the side wall 86 of the main cylinder 60 which is shown only schematically in FIG. 5. With depressurization of the hollow chamber 81, the plug 77 is returned to its lowermost position by the force of the spring 80.

A flushing gas, especially flushing air, at an increased pressure, can be introduced into the cylinder chamber 59. The flushing gas comes from a supply device 88 through a bore 89 (FIG. 9) in an uppermost end wall 90 of the main cylinder 60 and into the cylinder chamber 59. From the cylinder chamber 59 the flushing gas passes through for example six passages 91 distributed around the upper piston part 50 into the aperture 70 of the piston rod 46 and from there into the internal chamber 79 of the gripping elements 39. As necessary, a guide sleeve 92 is arranged in the internal chamber 79 outside the further cylinder 76, which conducts the flushing air downwards to the mouth 20 and to the sealing region between the mouth 20 and the gripping inserts 52. The guide sleeve 92 is fixed by grub screws 93 to the nut 45. By means of the flushing air, a certain excess pressure as compared with the ambient pressure is created in the internal chamber 79. In this way the penetration of coating powder into the internal chamber 79 is made more difficult or is prevented.

The main cylinder 60 is inserted into a substantially rectangular receiving tube 94 of the cross-tie 35. The end wall 90 is fixed radially outwardly to the cross-tie 35 by screws 95.

The supply device 88 includes a bridge 96 for each gripping unit 16. Through each bridge 96 there extends, in the horizontal direction, four parallel bores 97 in which respective tubular pipes 98 to 101 (FIGS. 8 and 12) are sealingly soldered. Each of the pipes 98 to 101 communicates from the underside of the bridge 96 with a connecting bore 102 to 105 (see also FIGS. 8 and 12). The connecting bore 104 is aligned with the bore 89 (FIG. 9). The connecting bores 102, 103 and 105 (see also FIG. 8) are aligned respectively with branch passages 106 to 108 (see also FIG. 9) formed in the end wall 90. The branch passage 106 issues into an axially parallel connecting passage 109 (FIGS. 9 to 11), the branch passage 107 issues into the connecting passage 87, and the branch passage 108 issues into an axially parallel connecting passage 110 (FIGS. 9 to 11).

The connecting passage 109 is connected permanently to an annular chamber 112 in the upper piston part 50 by way of an opening 111 in the side wall 86 which is shown only schematically in FIG. 5. The annular chamber 112 is in permanent communication with a cylinder chamber 114 above the piston 47 by way of a connecting passage 113.

The connecting passage 110 is in communication with an annular chamber 116 in the upper piston part 50 by way of an aperture 115 in the side wall 86 shown only schematically in FIG. 5 only when the base portion 38 is located in its lowermost position shown in FIG. 5. The annular chamber 116 is in permanent communication with a cylinder chamber 118 at the underside of the piston 47 by way of a connecting passage 117. Because of the axially comparatively short annular chamber 116, this ensures that then, when the base portion 38 is not located in its lowermost position, no pressure force is exerted on the underside of the piston 47 by pressurized medium.

Between each bridge 96 and the associated end wall 90 there is a surface seal (not shown in the drawings for the purpose of simplification) which is held in position by screws 119 (FIGS. 8, 9 and 12). The screws 119 penetrate the bridge 96 and are inserted (FIG. 12) into threaded bores in the end wall 90.

FIG. 6 shows a gripping unit 16 with the gripping elements 39 in their release position. The gripping elements adopt this release position before the glass containers 3 are taken from the lehr belt 5, and again later, when the glass containers 3 have been set down on the conveyor belt 22. The plug 77 sits on the mouth 20 in FIG. 6 and seals the interior of a glass container 3 against the penetration of foreign bodies, for example the coating powder. For this, the plug 77 has been displaced upwards relative to the further piston 75. If the gripping elements 39 are to grip the glass containers 3 from the release position shown in FIG. 6, then compressed air is introduced into the annular chamber 116, with the result that the piston 47 is driven upwards and consequently the gripping elements 39 are lowered about the axes 40 until the gripping inserts 52 have made sealing and shape-locking contact with the glass container 3.

In FIG. 7 there is shown yet another operational state of the gripping unit 16. Here, the plug 77 is located in its lowermost position caused by the spring 80, without it having come into contact with the mouth of the glass container 3. The glass container 3 in this case however is not coaxial with respect to the longitudinal axis 41. This has led to the result that, upon lowering of the gripping device 12, the right-hand gripping element 39 located in the release position has adversely made contact with the mouth 20. Upon further lowering of the gripping device 12, the base portion 38 with its upper piston part 50 has then been displaced further into the main cylinder 60 against the force of the spring 62. The connection from the aperture 115 into the annular chamber 116 has thereby been broken, so that the pressurized medium is not in a position to close the gripping elements 39 into their gripping position when the gripping elements 39 of the remaining gripping units 16 are closed in order to grip their glass containers 3.

FIG. 8 shows a piece of the respective pipes 98 to 101 which extend over the full length of the associated cross-tie 35. The pipes 98 and 101 are in the manner indicated in FIG. 8 connected to a multi-path valve 120. The pipe 99 is connected to a multi-path valve 121 and the pipe 100 to a multi-path valve 122.

FIGS. 9 to 12 show details of the gripping device 12 to which reference has already been made in part.

FIG. 13 shows another view of the gripping elements 39 located in their gripping position.

FIG. 14 illustrates the circumstances when the gripping elements 39 are located in their release positions. Then, between adjacent gripping elements 39 there are respective gaps 123, each of which is smaller than the diameter of the mouth 20 (FIG. 5). Thus, the mouth 20, during closure of the gripping elements 39 into their gripping positions, cannot escape through the intermediate spaces between the gripping elements 39, but, if the mouth 20 is arranged eccentrically in relation to the longitudinal axis 41, it is centered on the longitudinal axis 41 during the closure of the gripping elements 39.

FIG. 15 shows further details of the bayonet link 66. Within the elongate slot 65 the uppermost operating position of the pin 63 is shown in chain-dotted lines, this being the position which the pin adopts in the particular operational state according to FIG. 7. In this way an operating stroke 124 for the pin 63 is defined, which lies wholly within the elongate slot 65 but which does not however enter into the bayonet link 66. Unintentional release of the base portion 38 from the main cylinder 60 is therefore excluded.

From FIG. 15 it can also be observed that the gripping elements 39 which are closed in their gripping position have on all sides a radial overhang 125 of for example 5mm in relation to the glass container 3.

The coating 2 on the glass container 3 is shown in FIG. 15 as being of exaggerated thickness. The coating 2 is at least approximately duroplastic and results from a powder which has a constituent of hardenable resin and a hardener constituent. With such a coating, optimum protection is ensured for the virgin external glass surface or for an exterior glass surface provided already with a hot-end coating. This protection is primarily against mechanical damage. With this protection it is possible to reduce the wall thickness of the glass container, without thereby having to accept a reduction in the strength values of the finished packing container.

FIG. 16 shows details of the vessel 18, which, starting from its base 126, comprises in this sequence an air chamber 127, a porous plate 128 and a dispersing device 130 which is moveable in the powder 129. The air chamber 127 is divided into cells 131, 132 in order to achieve uniform through-flow of the powder 129 by compressed air. The powder, together with the compressed air which is fed from the air chamber 127, forms a fluidized sinter bed whose minimum level depth 133 and maximum level depth 134 are shown in FIG. 16 by chain-dotted lines. Ideally, the depth level is maintained at least approximately constant and by control of the drive of the handling unit 13 one can ensure that the gripping units 16 dip into the powder 129 at least approximately to the same depth and as little as possible, independently of the number of glass containers 3 which are gripped by the gripping device 12 in each operational cycle.

Above the dispersing device 130 there is arranged a cullet basket 135 which can be raised from the powder 129. Along an upper edge 136 of each vessel 18 there is arranged a suction channel 137 which is open towards the fluidized bed.

FIG. 17 shows details of two embodiments of heating register 30 according to FIG. 2. With the same raster size 55 as for the gripping device 12 according to FIG. 4, heating devices 138 or 139 are arranged in FIG. 17 below the base 31 (FIG. 16) of each glass container 3. Reference to the heating devices 138 means circular heating plates which are heatable by electrical resistance heating. The heating devices 139 are annular gas burners.

FIG. 18 shows a detail of one possible embodiment of the conveyor belt 22. The conveyor belt 22 consists in this case of wire mesh which comprises comparatively small and numerous support regions 140 which come into contact with the coated bases 31 of the glass containers 3.

In the embodiment of the apparatus 1 according to FIG. 19 there is provided at the pick-up site 11 an intermediate platform 141 with an aperture 142 therethrough, through which the handling device 13 with its gripping devices 12 for picking up the groups 10 of the glass containers 3 can be lowered and then raised again with the groups 10. The lehr 7 has a ceiling outlet 143 which is in vertical alignment with the aperture 142. The ceiling outlet 143 can be closed by a cover plate 144 which is as far and as long as possible, in order to save heat energy and in order to maintain the temperature conditions at the pick-up site 11 as constant as possible. The cover plate 144 is, for this purpose, displaceable in the directions of a double-headed arrow 145.

From the pick-up site 11 the handling device 13 with the group 10 is raised vertically up to the third level 21 and then travels in the horizontal direction to the right to a position above the vessel 18 which contains the coating medium. Then, the unit 13, 12 travels downwards until the group 10 dips into the vessel 18 as far as the second level 19. After sufficient deposition of the coating medium onto the glass containers 3, the unit 13, 12 is raised vertically again and then travels in the horizontal direction to a position above a set-down plate 146. This horizontal travel can take place at the third level 21 or at another level. For example, a higher level can be used for this purpose, for travel between the vessel 18 and the set-down plate 146, if as shown in FIG. 19, the comparatively high service station 25 is provided.

Having arrived above the set-down plate 146, the unit 13, 12 with the group 10 is lowered vertically downwards. Then, the gripping units 16 of the gripping device 12 are deactivated, so that they release the glass containers 3 of the group 10 and set them on the set-down plate 146.

The unit 13, 12 which is thus emptied is moved vertically upwards and then, in FIG. 19, is moved to the left above the service station 25. There, the gripping device 12 is cleaned, before the unit 13, 12, preferably at the third level 21, is moved further to the left to a position above the pick-up site 11, where the cycle begins anew.

The group 10 previously deposited on the set-down plate 146 is now gripped by another gripping device 147. This other gripping device 147 is carried by another handling device 148 and can be constructed in an essentially simpler manner than the gripping device 12. This is made possible by the fact that substantially no residual coating medium can adhere to this other gripping device 147. Preferably, this other gripping device 147 is moved in the horizontal direction to above the set-down plate 146, then is lowered in the vertical direction down to the group 10, is moved with the group 10 vertically upwards again and then, as illustrated in FIG. 19, is moved to the right horizontally to a position above the conveyor belt 22. There, this other gripping device 147 is deactivated, so that the group 10 is deposited on the conveyor belt 22. This other gripping device 147 is then moved, preferably vertically upwards and horizontally to the left until it returns again to a position above the set-down plate 146, as soon as a new group 10 has been deposited again there by the unit 13, 12 and the unit 13, 12 has been moved away again. Between the set-down plate 146 and the conveyor belt 22 the unit 148, 147 with the group 10 hanging from it can traverse a base setting zone corresponding to the base setting zone 29 in FIG. 2.

FIG. 20 shows a special positioning pattern for the glass containers 3 of the group 10. The glass containers 3 are delivered by the lehr belt 5 in this positioning pattern. Adjacent rows 14 and columns 4 are in this positioning pattern each off-set relative to one another by one half spacing 145; 150. The spacings themselves are indicated in FIG. 20 at 151 and 152. Each glass container 3 of the group 10 has a uniform size spacing 153 from all adjacent glass containers 3 of the group 10. For glass containers 3 of circular cross-section this is achieved by the longitudinal axes of each three adjacent glass containers 3 being arranged at the corners of an equilateral triangle 154.

According to FIG. 21, the set-down plate 146 is provided with holes 155 therethrough. An underside 156 of the set-down plate 146 is connected to a chamber 157 in which a reduced pressure can be created. If, upon the deposition of a group 10 of the glass containers 3 on the set-down plate 146, elements of the coating medium should become loose, these are sucked off through the holes 155 and travel through an outlet 158 from the chamber 157, through a pipe 159 and into a settling device 160. From an outlet 161 of the settling device 160 the settled coating medium is then extracted and recycled as much as possible. Cleaned carrier air exits from a further outlet 162 of the settling device 160.

There now follow several examples for the value V=(glass mass of the glass container (3) coated in accordance with the invention): (glass mass of a glass container according to the prior art having the same filling volume and the same filled product but uncoated or provided only with a hot-end coating and a cold-end coating):

0.33 l–Beer bottle with about 5 g $CO_2$/l V=100 g/130 g=0.77
0.5 l–Beer bottle with about 5 g $CO_2$/l V=130 g/180 g=0.72
0.33 l–Lemonade or mineral water bottle with about 8 g $CO_2$/l V=115 g/145 g=0.79
1.0 l–Lemonade or mineral water bottle with about 8 g $CO_2$/l V=290 g/400 g=0.73
0.75 l–Champagne bottle with about 10 to 12 g $CO_2$/l V=450 g/550 g=0.82

Bottles for wine or still water with up to 4 g $CO_2$/l:
0.75 l–Wine bottle V=240 g/330 g=0.73
1.0 l–Wine bottle V=250 g/350 g=0.72
1.0 l–Bottle for still water V=250 g/290 g=0.86
1.5 l–Bottle for still water V=380 g/480 g=0.79
16 US fluid ounces (=474 ml)–Soft drink bottle V=130 g/180 g=0.72
12 US fluid ounces (=355 ml)–Beer bottle for cold filling (without pasteurisation at up to 68° C.) V=120 g/195 g=0.62
500 ml–Soft drink bottle V=130 g/180 g=0.72
12 US fluid ounces (=355 ml)—Soft drink bottle V=115 g/160 g=0.72
13 US fluid ounces (=381 ml)—Beer bottle for cold filling V=130 g/210 g=0.62

What is claimed is:

1. A process for applying a coating to at least a portion of the exterior surface of glass containers, said containers each having an opening providing access to an interior of each container, said process comprising the steps of:

(a) bringing said glass containers to a temperature suitable for said coating process;

(b) gripping a group of said glass containers at a pick up site with a gripping device, temporarily sealing said openings in said containers, raising said group of glass containers in a substantially vertical direction to a first level above said pick up site, moving said group of glass containers horizontally to a position above a vessel containing a coating medium, lowering said group of glass containers in a substantially vertical direction into said coating medium to a second level and maintaining said glass containers therein until sufficient said coating medium adheres thereto;

(c) raising said group of glass containers substantially vertically from said second level to a third level and then moving said group substantially horizontally;

(d) unsealing said openings in said containers and transferring said group of glass containers onto a conveyor by releasing said containers from said first gripping device;

(e) moving said group of containers on said conveyor through a setting zone wherein at least a part of said coating medium adhered to said group of containers hardens; and (f) returning said first gripping device to grip a second group of glass containers.

2. A process according to claim 1, wherein said group of glass containers is moved in step (c) at said third level to a position directly above said conveyor.

3. A process according to claim 1, further comprising the steps of:

providing a base setting zone for hardening the coating on the bases of said group of glass containers;

moving said group of glass containers at said third level to said base setting zone after said step of raising said group of glass containers from said second level;

hardening the coating medium on each of the bases of said group of glass containers at said base setting zone; and moving said group of glass containers at said third level from said base setting zone to said position directly above said conveyor.

4. A process according to claim 3, further comprising the steps of:

moving said group of glass containers at said third level to above a set down plate prior to said step of hardening said coating medium on said bases, lowering said group of glass containers onto said set down plate, depositing said group of glass containers onto said set down plate by releasing said containers from said first gripping device and then returning said first gripping device in accordance with step (f); and gripping said group of glass containers on said set down plate with a second movable gripping device, raising said group of containers back to said third level and moving said group of glass containers substantially horizontally to said base setting zone.

5. A process according to claim 3, wherein step (f) further comprises the steps of moving said first gripping device substantially horizontally at a fourth level into a position above said pick up site and subsequently lowering said first gripping device down substantially vertically to said pick up site.

6. A process according to claim 3, wherein step (f) further comprises the steps of:

moving said first gripping device at a fourth level to a service station and servicing said first gripping device by performing steps including cooling said first gripping device, cleaning said first gripping device, discharging rejected glass containers from said first gripping device and/or replacing said first gripping device with a replacement first gripping device; and moving said first gripping device at said fourth level substantially horizontally into a position above said pick up site and subsequently lowering said first gripping device substantially vertically to said pick up site.

7. A process according to claim 1, wherein step (f) further comprises the steps of moving said first gripping device substantially horizontally at a fourth level into a position above said pick up site and subsequently lowering said first gripping device down substantially vertically to said pick up site.

8. A process according to claim 7, wherein said fourth level is substantially the same as said first level.

9. A process according to claim 1, wherein step (f) further comprises the steps of:

moving said first gripping device at a fourth level to a service station and servicing said first gripping device by performing steps including cooling said first gripping device, cleaning said first gripping device, discharging rejected glass containers from said first gripping device and/or replacing said first gripping device with a replacement first gripping device; and moving said first gripping device at said fourth level substantially horizontally into a position above said pick up site and subsequently lowering said first gripping device substantially vertically to said pick up site.

10. A process for applying a coating to at least a portion of the exterior surface of glass containers, said process comprising the steps of:

(a) bringing said glass containers to a temperature suitable for said coating process;

(b) gripping a group of said glass containers at a pick up site with a gripping device, raising said group of glass containers in a substantially vertical direction to a first level above said pick up site, moving said group of glass containers horizontally to a position above a vessel containing a coating medium, lowering said group of glass containers in a substantially vertical direction into said coating medium to a second level and maintaining said glass containers therein until sufficient said coating medium adheres thereto;
(c) raising said group of glass containers substantially vertically from said second level to a third level and then moving said group substantially horizontally;
(d) providing a base setting zone for hardening the coating on the bases of said group of glass containers;
(e) moving said group of glass containers at said third level to said base setting zone after said step of raising said group of glass containers from said second level;
(f) hardening the coating medium on each of the bases of said group of glass containers at said base setting zone;
(g) moving said group of glass containers at said third level from said base setting zone to a position directly above a conveyor;
(h) transferring said group of glass containers onto said conveyor by releasing said containers from said first gripping device;
(i) moving said group of containers on said conveyor through a setting zone wherein at least another part of said coating medium adhered to said group of containers hardens; and
(j) returning said first gripping device to grip a second group of glass containers.

* * * * *

UNITED STATES PATENT AND TRADEMARK OFFICE
CERTIFICATE OF CORRECTION

PATENT NO. : 6,329,019 B1 Page 1 of 1
DATED : December 11, 2001
INVENTOR(S) : Buschmeier et al.

It is certified that error appears in the above-identified patent and that said Letters Patent is hereby corrected as shown below:

<u>Title page</u>,
Item [75], Inventors, delete the following individuals as inventors:
"Gerhard Weiss and Antonio Leone"

Signed and Sealed this

Second Day of March, 2004

JON W. DUDAS
*Acting Director of the United States Patent and Trademark Office*